(12) United States Patent
Daly et al.

(10) Patent No.: US 11,678,014 B2
(45) Date of Patent: *Jun. 13, 2023

(54) CREATIVE INTENT SCALABILITY VIA PHYSIOLOGICAL MONITORING

(71) Applicant: Dolby Laboratories Licensing Corporation, San Francisco, CA (US)

(72) Inventors: Scott Daly, Kalama, WA (US); Poppy Anne Carrie Crum, Oakland, CA (US); Evan David Gitterman, Palo Alto, CA (US); Shane Mario Ruggieri, Campbell, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,357

(22) Filed: Sep. 7, 2022

(65) Prior Publication Data

US 2023/0007343 A1 Jan. 5, 2023

Related U.S. Application Data

(63) Continuation of application No. 17/281,946, filed as application No. PCT/US2019/053830 on Sep. 30, 2019, now Pat. No. 11,477,525.
(Continued)

(51) Int. Cl.
*H04N 21/442* (2011.01)
*H04N 21/422* (2011.01)
(Continued)

(52) U.S. Cl.
CPC ... *H04N 21/44218* (2013.01); *H04N 21/4126* (2013.01); *H04N 21/4223* (2013.01); *H04N 21/42201* (2013.01); *H04N 21/84* (2013.01)

(58) Field of Classification Search
CPC ....... H04N 21/42201; H04N 21/44218; H04N 21/8541; H04N 21/8456; H04N 21/4532; H04N 21/25866; H04N 21/44213
See application file for complete search history.

(56) References Cited

U.S. PATENT DOCUMENTS 7,953,219 B2 5/2011 Freedman
8,401,248 B1 3/2013 Moon
(Continued)

FOREIGN PATENT DOCUMENTS

WO 2017120469 A1 7/2017

OTHER PUBLICATIONS

Antonenko, Paas, Grabner, van Gog, (2010) Using Electroencephalography to Measure Cognitive Load, Educational psychology review V22, #4, pp. 425-438.
(Continued)

*Primary Examiner* — Jason Salce

(57) ABSTRACT

Creative intent input describing emotion expectations and narrative information relating to media content is received. Expected physiologically observable states relating to the media content are generated based on the creative intent input. An audiovisual content signal with the media content and media metadata comprising the physiologically observable states is provided to a playback apparatus. The audiovisual content signal causes the playback device to use physiological monitoring signals to determine, with respect to a viewer, assessed physiologically observable states relating to the media content and generate, based on the expected physiologically observable states and the assessed physiologically observable states, modified media content to be rendered to the viewer.

20 Claims, 19 Drawing Sheets

Related U.S. Application Data

(60) Provisional application No. 62/869,703, filed on Jul. 2, 2019, provisional application No. 62/739,713, filed on Oct. 1, 2018.

(51) Int. Cl.
  *H04N 21/4223* (2011.01)
  *H04N 21/84* (2011.01)
  *H04N 21/41* (2011.01)

(56) References Cited

U.S. PATENT DOCUMENTS

| | | | |
|---|---|---|---|
| 8,460,090 B1* | 6/2013 | Gilliland | G07F 17/3206 463/19 |
| 8,634,701 B2 | 1/2014 | Kang | |
| 8,784,206 B1* | 7/2014 | Gronkowski | G07F 17/3211 463/32 |
| 9,202,251 B2 | 12/2015 | Bist | |
| 9,552,346 B2 | 1/2017 | Allen | |
| 9,652,676 B1 | 5/2017 | Dey | |
| 9,788,777 B1 | 10/2017 | Knight | |
| 9,916,866 B2 | 3/2018 | Wouhaybi | |
| 10,009,644 B2 | 6/2018 | Aimone | |
| 11,477,525 B2* | 10/2022 | Daly | H04N 21/440245 |
| 2005/0223237 A1 | 10/2005 | Barletta | |
| 2009/0094629 A1 | 4/2009 | Lee | |
| 2009/0133047 A1 | 5/2009 | Lee | |
| 2009/0150919 A1 | 6/2009 | Lee | |
| 2010/0086204 A1 | 4/2010 | Lessing | |
| 2010/0211966 A1 | 8/2010 | Zhang | |
| 2012/0194648 A1 | 8/2012 | Hofshi | |
| 2012/0290950 A1 | 11/2012 | Rapaport | |
| 2012/0320014 A1 | 12/2012 | Longhurst | |
| 2014/0052682 A1 | 2/2014 | Phan | |
| 2014/0324749 A1 | 10/2014 | Peters | |
| 2015/0070516 A1 | 3/2015 | Shoemake | |
| 2015/0163550 A1 | 6/2015 | Tyndall | |
| 2015/0199995 A1 | 7/2015 | Silverstein | |
| 2016/0063874 A1 | 3/2016 | Czerwinski | |
| 2016/0165284 A1 | 6/2016 | Bargagni | |
| 2016/0180722 A1 | 6/2016 | Yehezkel | |
| 2017/0125059 A1 | 5/2017 | Zich | |
| 2017/0243596 A1 | 8/2017 | Eggerding | |
| 2017/0245023 A1 | 8/2017 | Brelis | |
| 2017/0293356 A1 | 10/2017 | Khaderi | |
| 2018/0008894 A1 | 1/2018 | Sack | |
| 2018/0316939 A1 | 11/2018 | Todd | |
| 2019/0355209 A1* | 11/2019 | Sorey | G07F 17/3206 |
| 2020/0197811 A1* | 6/2020 | Eatedali | G06N 3/08 |
| 2020/0206631 A1* | 7/2020 | Sumant | G06V 40/20 |

OTHER PUBLICATIONS

Cowen, A. S . et al (2017) Self-report captures 27 distinct categories of emotion bridged by continuous gradients. PNAS Sep. 19, 2017. 114 (38) E7900-E7909; published ahead of print Sep. 5, 2017.

Ekman, P. American Psychologist. 47 (4): 470-471. Apr. 1992. doi:10.1037/0003-066x.47.4.470.

Favre-Felix, A. et al "Real-time Estimation of Eye Gaze by In-Ear Electrodes" 2017 39th Annual International Conference of the IEEE Engineering in Medicine and Biology Society (EMBC), Seogwipo, 2017, pp. 4086-4089, date of publication: Jul. 2017.

Fleureau, J. et al "Physiological-Based Affect Event Detector for Entertainment Video Applications" IEEE Transactions on Affective Computing, vol. 3, No. 3, Jul.-Sep. 2012, pp. 379-385.

Hladek, Porr, Brimijoin (2018) Real-time estimation of horizontal gaze angle by saccade integration using in-ear electrooculography, PLOS.

https://web.archive.org/web/20180819041830/http:/neurable.com/ http://neurable.com/ disclosed on Aug. 20, 2018.

Karev, Kirill, "Behold the Next Generation VR Technology: Part 6-Brain Interface" https://medium.com/inborn-experience/behold-the-next-generation-vr-technology-part-6-brain-interface-89b1d31a0a96, Mar. 30, 2018, pp. 1-8.

Doerrfeld, Bill, 20+Emotion recognition API'S That will Leave you Impressed, and Concerned; https://nordicapis.com/20-emotion-recognition-apis-that-will-leave-you-impressed-and-concerned/ Dec. 31, 2015.

Rodriguez, Ashley, Quartz Smile "While you're Watching Disney's Films at the Cinema, Disney can now watch you"https://qz.com/1039102/disney-can-now-use-infrared-cameras-to-track-your-reactions-to-films-in-darkened-cinemas, published Jul. 26, 2017 ,pp. 1-3.

Morrison, Geoffrey, CNET "Dolby Vision, HDR 10, Technicolor and HLG: HDR Formats Explained" https://www.cnet.com/news/dolby-vision-hdr10-advanced-hdr-and-hlg-hdr-formats-explained/ Sep. 21, 2019.

"The Seven Basic Emotions: Do you know them?" (Jun. 12, 2010), retrieved at https://www.humintell.com/2010/06/the-seven-basic-emotions-do-you-know-them.

Kim, Dong Keun et al "Interactive Emotional Content Communications System Using Portable Wireless Biofeedback Device" Interactive Emotional Content Communications System Using Portable wireless Biofeedback Device, pp. 1929-1936, vol. 57, No. 4, Nov. 2011.

Muhl, Jeunet, and Lotte (2014) EEG-based workload estimation across affective contexts. Front. Neuroscience V 12 https://www.frontiersin.org/articles/10.3389/fnins.2014.00114/full.

Nhan and Chau (2010) Classifying Affective States Using Thermal Infrared Imaging of the Human Face, IEEE Tran Biomedical engineering, V57.

P. J. Lang, M. M. Bradley, and B. N. Cuthbert, "International affective picture system (IAPS): Affective ratings of pictures and instruction manual. Technical report A-6," Univ. Florida, Gainesville, FL, Tech. Rep. 6, 2005.

P. Shem, S. Wang, and Z. Liu (2013) facial expression recognition from infrared thermal videos, In: Lee S., Cho H., Yoon KJ., Lee J. (eds) Intelligent Autonomous Systems 12. Advances in Intelligent Systems and Computing, vol. 194. Springer, Berlin, Heidelberg.

Plutchik-Plutchik, Robert (1980), Emotion: Theory, research, and experience: vol. 1. Theories of emotion, 1, New York: Academic.

Poppy Crum, Ted 2018; https://www.ted.com/talks/poppy_crum_technology_that_knows_what_you_re_feeling?language=en.

Wong, Daniel E., Hjortkjær, Jens; Ceolini, Enea; Nielsen, Søren Vørnle; Griful, Sergi Rotger; Fuglsang, Søren; Chait, Maria; Lunner, Thomas; Dau, Torsten; Liu, Shih-Chii; Cheveigné, Alain de (2018). A closed-loop platform for real-time attention control of simultaneous sound streams., ARO Midwinter meeting.

* cited by examiner

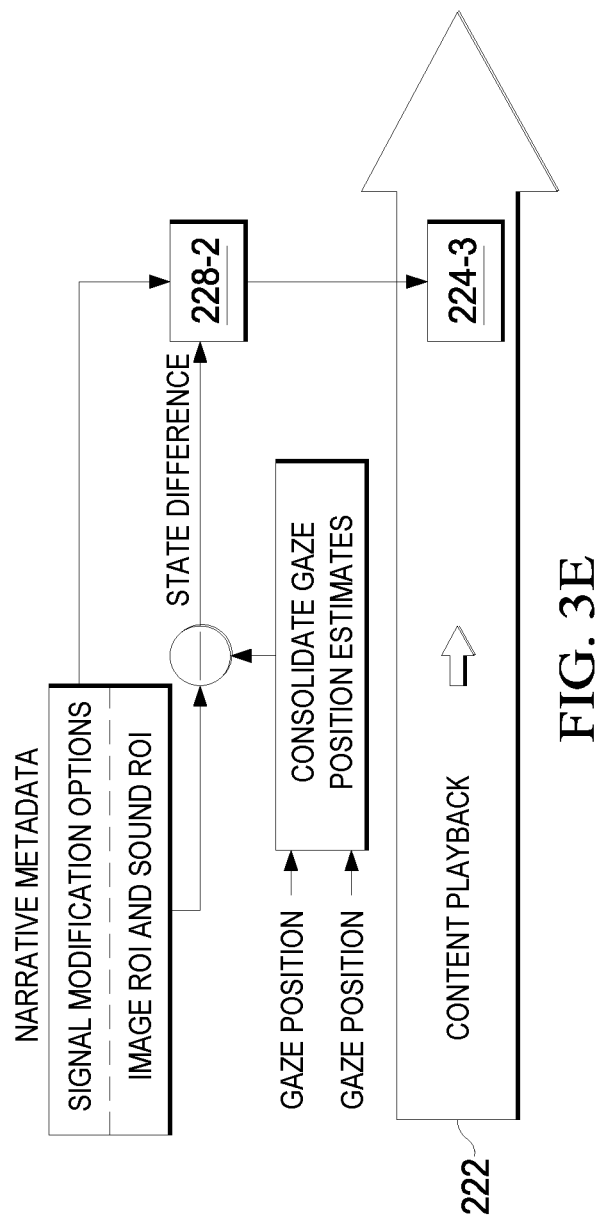

CREATIVE INTENT SCALABILITY VIA PHYSIOLOGICAL MONITORING

CROSS-REFERENCE TO RELATED APPLICATIONS

This application is a continuation of U.S. patent application Ser. No. 17/281,946, filed on Mar. 31, 2021, which is the U.S. national stage of International Patent Application No. PCT/US2019/053830, filed Sep. 30, 2019, which claims the benefit of priority to U.S. Provisional Patent Application No. 62/869,703, filed Jul. 2, 2019, and to U.S. Provisional Patent Application No. 62/739,713, filed Oct. 1, 2018, all of which are hereby incorporated by reference in their entireties.

TECHNOLOGY

The present invention relates generally to audiovisual technologies, and in particular, to creative intent scalability across playback devices via physiological monitoring.

BACKGROUND

Today's audiovisual ecosystem includes a wide variety of diverse playback devices (e.g., image and/or acoustic reproduction, etc.) that the audience's experience can change substantially for the same source audiovisual content. In many cases, significant changes in the audience's experience with different playback devices cause a distortion of the creative intent based on which the audiovisual content is/was created.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A through FIG. 3G illustrate example media rendering processing for physiologically observable states and corresponding metadata by playback devices;

DESCRIPTION OF EXAMPLE EMBODIMENTS

Figure 1A:
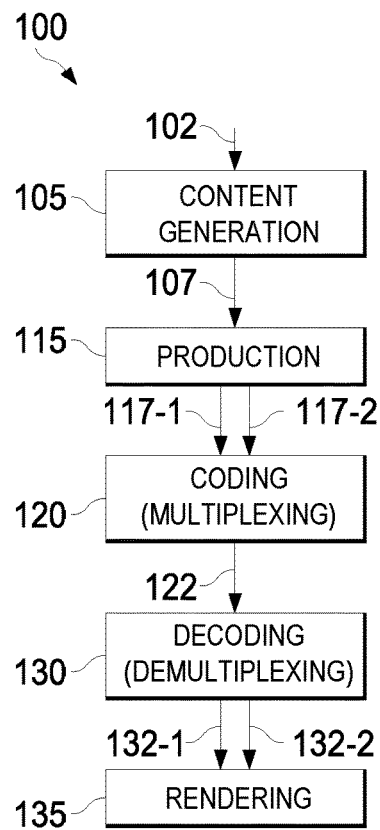
FIG. 1A depicts an example process of a media content delivery pipeline.

Example embodiments, which relate to creative intent scalability via physiological monitoring, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. General Overview
2. Example Media Content Delivery Processing Pipeline
3. Creative Intent
4. Emotions and Representations
5. Physiological Monitoring and Assessment
6. Metadata Control and Physiological Monitoring
7. Content and Metadata Production and Consumption
8. Emotional Expectations and Narrative Metadata Format
9. Signal Segregation and Fusion
10. Media Content Adjustments or Modification
11. Example Content Adjustment Processes
12. Example Process Flows
13. Implementation Mechanisms—Hardware Overview
14. Equivalents, Extensions, Alternatives and Miscellaneous 1. General Overview This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to modify or adapt audiovisual content being rendered by playback devices to audiences or viewers for the purpose of preserving the creative intent based on which the audiovisual content is/was created.

More specifically, the rendering of the audiovisual content is affected by, or adapted to, an assessment of the viewer's internal physiological state (e.g., emotion, cognition, attention locus, etc.) which is obtained or deduced by various types of monitoring of the viewer's physiological aspects. This assessment of the viewer's internal physiological state is combined with narrative and emotional expectation that is expected and/or intended by creatives of the audiovisual content and that is inserted into media metadata for the audiovisual content during the audiovisual content and metadata production stages (or post-production stages).

The creative intent of the audiovisual content, as inserted into or represented by the media metadata, includes emotion and narrative goals of creators of the audiovisual content. Additionally, optionally or alternatively, the media metadata includes instructions for modifying received an audiovisual signal from which the media content and metadata is received by the playback devices.

Under techniques as described herein, affective computing such as artificial emotional intelligence (or emotion AI) may be used to recognize, interpret, simulate, estimate or predict human emotion, understanding, behavior, etc. Computational models (e.g., algorithms, methods, procedures, operations, etc.) can be used to consolidate multiple sources of physiological monitoring signals as well as interactions with the media metadata and the playback device used for final rendering, reproduction and/or transduction of the source signal that contains media content depicting the audiovisual content to the viewer. As a result, these techniques allow for the creative intent as represented in the media content and metadata to be scalable as best as possible across many types of playback systems. As used herein, scalability means that techniques as described herein can work across a wide variety of different devices—such as small smartwatch devices, tablets, mobile handsets, laptops, high-end playback devices, large theater-based systems, cinema-based systems, etc.—to prevent or minimize deviations from the creative invent.

As used herein, rendering refers to image and/or audio processing operations that render image and/or audio content to a single viewer audience or a multiple-viewer audience. Example image processing operations include, without limitation, spatiotemporal, color, depth, cropping, steering the image signal across multiple playback devices as needed, etc. Example audio processing operations include, without limitation, positional (e.g., directional, spatial, etc.), equalization, reverberation, timbre, phase, loudspeaker selection, volume, etc. Both image and audio processing as described herein can be linear, nonlinear and/or adaptive.

Example embodiments described herein relate to encoding and/or providing media content and metadata for optimizing creative intent from a playback of a media signal representing audiovisual content. Creative intent input describing emotion expectations and narrative information relating to one or more portions of media content is received. One or more expected physiologically observable states relating to the one or more portions of the media content are generated based at least in part on the creative intent input. An audiovisual content signal with the media content and media metadata comprising the one or more expected physiologically observable states for the one or more portions of the media content is provided to a playback apparatus. The audiovisual content signal causes the playback device (a) to use one or more physiological monitoring signals to determine, with respect to a viewer, one or more assessed physiologically observable states relating to the one or more portions of the media content and (b) to generate, based at least in part on the one or more expected physiologically observable states and the one or more assessed physiologically observable states, modified media content from the media content as the modified media content generated from the media content is being adjusted and rendered to the viewer.

Example embodiments described herein relate to decoding and/or consuming media content and metadata generated for optimizing creative intent from a playback of a media signal representing audiovisual content. An audiovisual content signal with media content and media metadata is received. The media metadata comprises one or more expected physiologically observable states for one or more portions of the media content. The one or more expected physiologically observable states relating to the one or more portions of the media content are generated based at least in part on creative intent input describing emotion expectations and narrative information relating to one or more portions of media content. One or more physiological monitoring signals are used to determine, with respect to a viewer, one or more assessed physiologically observable states relating to the one or more portions of the media content. Modified media content from the media content is generated and rendered, based at least in part on the one or more expected physiologically observable states and the one or more assessed physiologically observable states, as the modified media content generated from the media content is being adjusted and rendered to the viewer.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Media Content Delivery Processing Pipeline

FIG. 1A depicts an example process of a media content delivery pipeline 100 showing various stages from media content capture/generation to playback devices. Some or all processing blocks of the media content delivery pipeline (100) may be implemented with one or more computer devices, in hardware, in software, in a combination of hardware and software, and so forth.

Example playback devices as described herein may include, but are not limited to, mobile devices, theater-based devices, augmented reality (AR) devices, virtual reality (VR) devices, computer game devices, TVs, home theaters, headmounted devices, wearable devices, etc.

As illustrated in FIG. 1A, audiovisual data 102 is captured or generated using a media content generation block 105. The audiovisual data (102) may be digitally captured (e.g. by digital camera and/or digital audio recorder, etc.) or generated by a computer (e.g. using computer animation and/or computer authoring/synthesis, using image rendering models, etc.) to provide initial media content 107 in realtime or non-realtime operations. Additionally, optionally or alternatively, the audiovisual data (102) may be captured and stored as analog signals recorded on tangible media. The captured or recorded analog signals is optionally read and converted to a digital format to provide at least a part of the initial media content (107).

Example audiovisual data and/or initial media content as described herein may include, but is not necessarily limited to only, any of: audio data only such as audio samples or transform coefficients in audio frames/blocks, video data only such as image pixel values or transform coefficients in image frames/blocks, a combination of audio and video data, with or without audio metadata separate from audio data, with or without image metadata separate from video data, with or without other multimedia and/or text data, etc.

As shown in FIG. 1A, the initial media content (107) is provided to and edited or transformed by a media production block 115 in accordance with the creator's intent into a release version (e.g., a single release version, among multiple release versions targeting different user populations, etc.) before being passed to the next processing stage/phase in the video delivery pipeline (100). The release version comprises media metadata 117-1 and corresponding media content 117-2.

The media production block (115) may be implemented with one or more audio editing or authoring devices, one or more video editing or authoring devices, reference audio rendering devices, and/or reference video rendering devices. Some or all of these devices may, but are not limited to, operate and interact with the creator (e.g., creatives, creative users, etc.) in a movie studio, a commercial media production system, a home-based media production system, etc. In some operational scenarios, the media production block (115) comprises one or more of: color grading stations, reference display devices, audio mixers, audio editors, metadata generators, etc.

The creator of the release version—including but not limited to a movie studio designated professional, media production staff, one or more video/audio professionals, an amateur video/audio content creator, etc.—interacts with the media production block (115) to provide (creative) user input or creative intent input to the media production block (115) and cause the media production block (115) to perform selection, audio mixing and editing of sound elements (e.g., in the initial media content (107), from live or recorded audio elements, a sounds library or toolkit accessible to the media production block (115), etc.) to generate audio content of the media content (117-2). Likewise, the creator of the release version may interact with the media production block (115) to provide (creative) user input to the media production block (115) and cause the media production block (115) to select, edit, compose, set tones, saturations, hues, and colors of visual elements (e.g., in the initial media content (107), from visuals library or toolkit accessible to the media production block (115), etc.) to generate visual content of the media content (117-2).

Selecting, audio mixing and editing of sound elements as described herein may include, but are not necessarily limited to only, one or more of: selecting, mixing and/or editing sound elements. Audio selection, mixing and/or editing may be performed with significant or minimal manual user input (e.g., in the case of pre-recorded audio/audiovisual productions, etc.), partly or fully automatically (e.g., with little or no user input/interaction, etc.), according to pre-determined parameters/algorithms/procedures (e.g., in the case of live broadcasts, etc.), a combination of automatically performed and/or user-assisted audio mixing and editing operations, and so forth. Example audio or sound elements may include but are not necessarily limited to only, any of: acoustic elements, audio elements, sound tracks, sound effects, dialogue, conversations, Foley effects, music from instruments or human voices, sounds from objects and/or animals, natural sounds, artificial sounds, ambient sound, stationary sound elements, moving sound elements, etc.

Selection, editing, composing, setting tones, saturations, hues, and colors of visual elements may include performing color grading (or "color timing") on visual elements to generate visual content to be included in the media content (117-2). These operations including but not limited to color grading may be performed with significant or minimal manual user input (e.g., in the case of pre-recorded visual/audiovisual productions, etc.), partly or fully automatically (e.g., with little or no user input/interaction, etc.), according to pre-determined parameters/algorithms/procedures (e.g., in the case of live broadcasts, etc.), a combination of automatically performed and/or user-assisted audio mixing and editing operations, and so forth. Example visual or image elements may include but are not necessarily limited to only, any of: visual objects, visual characters, image features, visual effects, images or image portions depicting humans, images or image portions depicting objects and/or animals, real life images, artificial images, background, stationary visual elements, moving visual elements, etc.

While being generated by way of the interaction between the creator and the media production block (115), the audio content of the media content (117-2) may be rendered, listened to and/or continually adjusted by the creator in a reference rendering/production environment, until the sound elements represented in the audio content of the media content (117-2) are rendered/reproduced/perceived in the reference rendering/reproduction environment with desired qualities/effects which agree with or otherwise express the creator's creative intent. Likewise, the visual content of the media content (117-2) may be rendered, viewed and/or continually adjusted by the creator in the reference rendering/production environment, until the visual elements represented in the visual content of the media content (117-2) are rendered/reproduced/perceived in the reference rendering/reproduction environment with desired qualities/effects which agree with or otherwise express the creator's creative intent.

The media content (117-2) in the release version may include, but is not necessarily limited to only, any of: audio data only such as audio samples or transform coefficients in audio frames/blocks, video data only such as image pixel values or transform coefficients in image frames/blocks, a combination of audio and video data, with or without audio metadata separate from audio data, with or without image metadata separate from video data, with or without other multimedia and/or text data, etc. Example media content may include, but are not necessarily limited to only, one or more of: TV shows, media programs, audiovisual programs, live broadcasts, media streaming sessions, movies, etc.

As a part of generating the release version from the initial media content (107), the media production block (115) also generates or produces the media metadata (117-1) corresponding to the media content (117-2). The media metadata (117-1) includes, but is not necessarily limited to only, some or all of: audio metadata, image metadata, emotional expectations metadata, narrative metadata, etc.

The audio and/or image metadata in the media metadata (117-1) may include relatively low-level operational parameters to be used in audio and/or image processing operations. The audio and/or image metadata in the media metadata (117-1) may metadata portions that are (e.g., directly, etc.) related to physiological monitoring as well as metadata portions that are not (e.g., directly, etc.) related to physiological monitoring.

Values set for some or all the operational parameters in the audio and/or image metadata may be content specific. For example, operational parameters included in the audio or image metadata (respectively) for audio or image processing operations to be performed in relation to a specific image, a specific visual scene, a specific audio frame, a specific audio scene, etc., may be set with values that are dependent on (respectively) specific pixel values, specific audio sample values, specific distributions of pixel values and/or audio sample values, etc., in the specific image, specific visual scene, specific audio frame, specific audio scene, etc.

Additionally, optionally or alternatively, values set for some or all the operational parameters may be device specific. For example, operational parameters included in the audio or image metadata (respectively) for audio or image processing operations to be performed by a specific playback device (or devices operating therewith) may be set with values that are dependent on the specific playback device, its system configuration, its image display or audio rendering capabilities, its operational, rendering and/or reproduction environment, other devices operating in conjunction with the specific playback device, etc.

The emotional expectations and/or narrative metadata (or simply "E&N metadata") in the media metadata (117-1) includes time-dependent expected emotional states and/or cognition states generated based on the creator's intent conveyed at least in part to the media production block (115) through the (creative) user input. The expected emotional states and/or cognition states represent target physiologically observable (or to-be-monitored) states which the content creator expects a viewer to be in or have while the media content (117-2) is being adjusted and rendered to the viewer by various playback devices.

It should be noted that, in various embodiments, the creatives may expect a single emotion (or a single emotion type) or several emotions (or several emotion types) for a given time point or a depicted scene. For example, a viewer may choose to identify with one side (e.g., the good side, etc.) in a depicted story, whereas a different viewer may choose to identify with a different side (e.g., the evil side, etc.) in the same depicted story. Thus, two emotional states can be possibly expected by the creatives for a given viewer, depending on which sides the viewer is on. A first emotional state to be expected by the creatives for the viewer may be "sympathy" if the viewer's chosen side is losing. A second emotional state to be expected by the creatives for the viewer may be "happy" when the same storyline information is being depicted if the viewer happens to choose the opposite side.

While at least some of the E&N metadata may be generated based on user input provided by the content creator while the creator is creating the release version of the media content (117-2) and interacting with the media production block (115), some or all the E&N metadata may also be generated based on a different creative input conveyance mechanism including but not limited to: a (e.g., non-interactive, non-realtime, offline, etc.) storyboard relating to emotional expectations or narrative information of the story depicted in the release version. Newer techniques use digital storyboarding and scripts in the form of electronic text. Also, Previs (previsualization) which was originally used solely for computer graphics is now being used for live camera capture and associated software provides a place for director comments.

It should be noted that, in contrast with other approaches that do not implement techniques as described herein, the E&N metadata in the media metadata (117-1) under the techniques as described herein is to be (e.g., relatively tightly, etc.) coupled or used with physiological monitoring and assessment operations performed by the playback devices while rendering the media content (117-2). The playback devices use both the E&N metadata and the physiological monitoring and assessment to derive and make media content adjustments or modifications to the media content (117-2) as needed to preserve or avoid distortions to the creator's intent while rendering the media content (117-2) to an audience.

The E&N metadata may comprise one or more metadata portions, respectively, for one or more data portions in the media content (117-2) to be rendered at one or more time points, in one or more time intervals, in one or more scenes, etc. Each metadata portion in the E&N metadata of the media metadata (117-1) may specify a physiologically observable state such as an expected emotion state and/or an expected cognition state (or simply E&N state) for a respective data portion in the media content (117-2) to be rendered at a time point, a time interval, a scene, etc.

The expected (or target) E&N state may be specified in one or more monitoring-device specific ways. For example, the expected E&N state may be specified as expected measurement/assessment results that are Galvanic Skin Response or GSR specific, electro-oculogram or EOG specific, electroencephalogram or EEG specific, specific to facial expression analysis, specific to pupilometry, and so forth. "Narrative" state of the viewer may be (e.g., generally, sometimes, etc.) referred to as a cognitive state. To support different monitoring devices or technologies that may be operating (or may be configured) with various playback devices in different rendering environments, more than one monitoring-device specific (or more than one rendering-environment specific) ways can be specified for a single expected E&N state.

Additionally, optionally or alternatively, the expected E&N state may be specified in a way generic to physiological monitoring devices or technologies. A playback device receiving the generically specified expected E&N state in the release version may map the expected E&N state to expected measurement/assessment results of specific available monitoring devices or technologies operating (or configured) with the playback device.

In addition to indicating expected E&N states, the E&N metadata in the media metadata (117-1) may also carry content modification metadata portions including but not limited to signal modification options, (image) regions of interest (ROIs), audio or acoustic objects of interest (AOIs), attendant operational parameters, etc. The content modification metadata portions can be used by the playback devices for effectuating the media content adjustments or modifications made based on the expected E&N states and the physiological monitoring and assessment while the media content (117-2) as adjusted or modified is being adjusted and rendered to an audience.

In an example, the content modification metadata portions can indicate or identify one or more (e.g., key, etc.) sound elements in a data portion of the media content (117-2) as one or more AOIs to which audio processing operations effectuating the media content adjustments or modifications can make (e.g., acoustic, positional, diffusion, timbre, loudness, etc.) adjustments or modifications.

In another example, the content modification metadata portions can indicate or identify one or more visual elements or areas in a data portion of the media content (117-2) as one or more ROIs to which audio processing operations effectuating the media content adjustments or modifications can make (e.g., luminance, spatial resolution, contrast, color saturation, tone mapping, etc.) adjustments or modifications.

During content consumption, in response to determining that a viewer's assessed E&N state is diverging from the expected E&N state, the playback device may use one or more content modification metadata portions to generate or carry out adjustments/modifications to the media content (117-2) to steer the viewer's attention locus toward (or in some circumstances possibly away from) AOIs and/or ROIs depicted in the media content (117-2) and thus to cause the viewer's (subsequent) assessed E&N state to converge to the viewer's expected E&N state as indicated in the E&N metadata.

The release version may be made available to playback devices operating in various rendering/reproduction environments. The media production block (115) may operate with a reference rendering environment different from an actual rendering environment with which a playback device operates. Some or all of the media content (117-2) and the media metadata (117-1) may be specified in reference to the reference and/or zero or more other (e.g., target, etc.) rendering environments. A playback device operating with a specific (or actual) rendering environment different from the rendering environment(s) in reference to which the release version is created can adapt some or all of the media content (117-2) and the media metadata (117-1) in the release version from a reference rendering environment to the specific rendering environment.

Corresponding media metadata and media content in a release version as described herein may be encoded (e.g., with separate metadata or data containers, etc.) in one or more coded bitstreams (e.g., a video signal, etc.), recorded on tangible computer-readable storage media, and/or transmitted or delivered to a recipient device (e.g., a recipient playback device, a recipient device operating with one or more playback devices, etc.).

As illustrated in FIG. 1A, a media coding block 120 receives the release version comprising media content (117-2) and the media metadata (117-1) from the media production block (115); encodes the release version into a coded bitstream 122. As used herein, a coded bitstream may refer to an audio signal, a video signal, an audiovisual signal, a media data stream comprising one or more sub-streams, and so forth. The media coding block (120) comprises one or more audio and video encoders, such as those defined by ATSC, DVB, DVD, Blu-Ray, and other delivery formats, to generate the coded bitstream (122).

The coded bitstream (122) is delivered downstream to one or more receivers or recipient devices or playback devices including but not limited to decoders, media source devices, media streaming client devices, television sets (e.g., smart TVs, etc.), set-top boxes, movie theaters, or the like.

As illustrated in FIG. 1A, in a playback device, the coded bitstream (122) is decoded by a media decoding block 130 to generate decoded media metadata 132-1 and decoded media content 132-2. The media decoding block (130) comprises one or more audio and video decoders, such as those defined by ATSC, DVB, DVD, Blu-Ray, and other delivery formats, to decode the coded bitstream (122).

The decoded media metadata (132-1) may include and may be identical to some or all of the media metadata (117-1) encoded (e.g., with lossless compression, etc.) into the coded bitstream (122) by the media coding block (120). The decoded media content (132-2) may be identical, or correspond, to the media content (117-2) subject to quantization and/or coding errors caused by (e.g., lossy, etc.) compression performed by the media coding block (120) and decompression performed by the media decoding block (130).

The decoded media metadata (132-1) can be used together with the decoded media content (132-2) by the playback device, or audio and/or image rendering device(s) 135 operating in conjunction with the playback device, to perform physiological monitoring, physiological state assessment, media content adjustments or modifications, audio processing, video processing, audio reproduction/transduction, image rendering/reproduction, and so forth, in a manner that preserves, or minimizes or avoids distortions to, the creator's intent with which the release version has been generated.

Figure 1B:
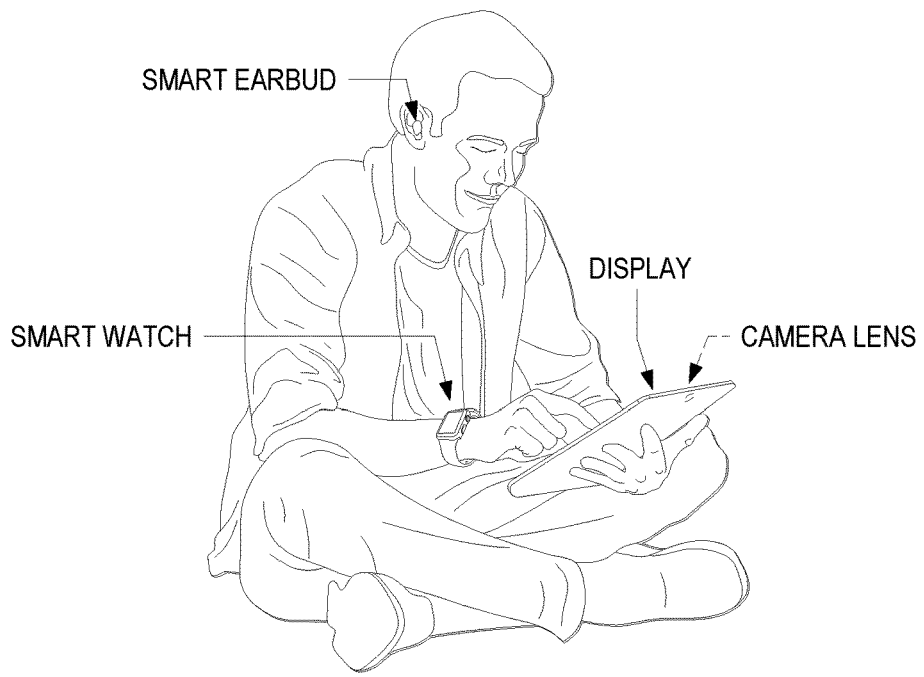
FIG. 1B illustrates an example playback device and other devices operating with the playback device in a rendering environment.

FIG. 1B illustrates an example playback device and other devices operating with the playback device in a rendering environment. Any of these devices and components therein may be implemented with hardware, software, a combination of hardware and software, etc. These devices may include a media decoding block (e.g., 130 of FIG. 1A, etc.) and audio and/or image rendering device(s) (e.g., 135 of FIG. 1A, etc.).

As shown, a solo viewer (or audience) is watching images rendered based on media content (e.g., 117-2 of FIG. 1A, etc.) on a display of the playback device such as a tablet computer and listening to audio (corresponding to or accompanying the rendered images) rendered based on the media content (117-2) through a smart earbud device. One or more physiological monitoring components may include a camera lens that captures the viewer's facial expressions to be analyzed by facial expression analysis software deployed with the playback device, sensors and/or electrodes deployed with the smart earbud device and/or a smartwatch device, etc. These components may be deployed for physiological monitoring at various locations of the viewer's head or body. Sensory signals and/or data generated from the physiological monitoring may be processed to assess the viewer's E&N states while the media content (117-2) is being adjusted and rendered to the viewer. Content rendering on the display and with the earbud device may be adjusted or modified based on media metadata (e.g., 117-1 of FIG. 1A, etc.) received by the playback device with the media content (117-2) and the physiological monitoring/assessment.

For the purpose of illustration only, it has been described that physiological monitoring and assessment may be performed with the solo viewer such as illustrated in FIG. 1B. It should be noted that techniques as described herein are intended for an audience ranging from a single viewer to a large group in a theater. While FIG. 1B shows a viewer with some possible physiological monitoring components and sensors embedded in portions of a playback device or devices such as the smartwatch device operating with the playback device in a specific rendering environment, physiological monitoring may be implemented and deployed in rendering environments (e.g., as illustrated in FIG. 2F, etc.) involving audiences with multiple viewers up to a very large group such as audiences in theaters, stadiums, events, and so forth.

It should also be noted that media consumption may involve only audio, but distinctions between "viewers" and "listeners" may not be called out in all cases in this disclosure. A viewer and/or a listener may be generally referred to herein as a viewer.

3. Creative Intent

Various terms such as creator's intent, creative intent, artistic intent, director's intent, producers' intent and approvers' intent and the like are examples of similar terms that have not been defined rigorously. The term "artistic intent" arose from the world of literature, painting, sculpture, and art philosophy and was originally used for a solo artist. The other terms are modifications arising from cinema production, where a much larger staff is involved in the overall production. The decisions regarding the final look and sound of a media product may be made by the director, the producers, as well as the colorists, cinematographers, musicians, and sound engineers for specific aspects of the work. SMPTE now uses the term approvers' intent, which acknowledges the wide variability among who makes the final decision for determining the version that will be distributed. This includes editing, overall look, and sound of the media content, as well as variations intended for specific viewer/listener populations.

Since this disclosure relates to the details of media production stages, such as involving interactions with the skilled technical and artistic staff, the term "creative intent" or "creator's intent" is used to describe the various goals of the media work from its creative staff.

For narrative media content such as narrative cinema, audio books, musicals, opera and the like, creative intent can comprise various elements, but most fall in one of the following categories or aspects:

Narrative information as needed by (or to be conveyed for) the story, such as whether the viewer is able to perceive various information elements that make up the narrative, whether a depicted visual element is visible, whether a rendered sound element is audible, whether a depicted or rendered visual/sound element is at the right location, whether dialogue is understandable, how a specific playback device and an ambient surrounding of the playback device affect some or all visual and/or sound elements, and so forth.

Emotional expectations of the story, such as whether the viewer experiences expected emotions that are intended by the creator, how color/contrast/timbre/ dynamics affect these both in terms of range and accuracy, arousal, valence, and so forth. Lower-level physiological responses/reflexes, such as due to jarring moments, may be classified as a type of emotion for the purpose of this disclosure.

Aesthetics expected to be perceived and appreciated by the viewer as intended by the creator. The creator (or artists) may choose a certain color on purpose, whether by whim, feeling, personal color harmony understanding, symbolism, etc.

A system as described herein seeks to match the intended aesthetics in various rendering environments. In operational scenarios in which certain rendering options as intended by the creator are not available or technically feasible in an actual rendering environment, the system can determine whether there are other acceptable rendering options available in the actual rendering environment that still meet the creative intent of the artists. For example, changing a musical key to accommodate a singer's range is often acceptable as an alternative for preserving or respecting the creative intent. Analogous or alternative visual elements may also be used as alternatives for preserving or respecting the creative intent.

In some operational scenarios, asymmetry of aesthetics may become a meaningful issue. For example, it may be an acceptable rendering option to reduce the color saturation on image content playback if the playback device is limited in display capabilities; however, it may not always be an acceptable rendering option to boost the color saturation even if the playback device has a larger range than that used to set or express the creative intent.

Message. The combination of the storyline, evoked emotions, aesthetics, etc., may be for the overall purpose of conveying a message. However, there may exist cases in which the creative intent only expects to focus on the three categories or aspects as identified above and is free of an overall message.

Resume. Audiovisual content can contain creative aspects, features and details that indicate or show off technical or creative quality that may only be appreciated by experts or connoisseurs, who may represent a margin or a tiny fraction of an overall content consumer population intended by the content creator.

Techniques as described herein may or may not address all five categories or aspects of creative intent as discussed above. In some operational scenarios, a system as described herein may address only a subset of the five categories or aspects of creative intent, such as the first two: the narrative information aspect and the emotional expectations or effects aspect. Additionally, optionally or alternatively, the system may address the third aspect, aesthetics, either by way of the narrative information aspect when the aesthetics are deemed important to narrating the story (e.g., symbolic colors, etc.) or by way of the emotional expectations or effect aspect when the aesthetics are deemed important to influencing or inducing the emotion expectation or effect.

4. Emotions and Representations

There are several taxonomies on emotion, ranging from a relatively small number such as the six from Elkman theory, to others containing more nuances and including almost thirty different emotions.

Some emotions have corresponding facial expressions, while others involve deeper internal feelings without visible signs to naked eyes or other vision techniques. The emotions that have—or are accompanied with corresponding—facial expressions may be considered as a distinct set, since those can be the most easily assessed in some operational scenarios. For example, a camera pointed at audience or a solo viewer and facial expression analysis software may be used to obtain estimates of those emotions accompanied by corresponding facial expressions.

TABLE 1 below shows four human emotion taxonomies (with their respective numerosity in parentheses) as well as an example subset that may be analyzed or determined from facial expressions.

TABLE 1

| Elkman Theory (6) | Plutchik Theory (8) | Core anonymous (7) | Cowan Theory (27) | Facial Expressions (9) |
| --- | --- | --- | --- | --- |
| Joy | Joy | Happiness (joy) | Joy | Happiness (joy) |
| Surprise | Surprise | Surprise | Surprise | Surprise |
| Sadness | Sadness | Sadness | Sadness | Sadness |

TABLE 1-continued

| Elkman Theory (6) | Plutchik Theory (8) | Core anonymous (7) | Cowan Theory (27) | Facial Expressions (9) |
|---|---|---|---|---|
| Anger | Anger | Anger | Anger | Anger |
| Disgust | Disgust | Disgust | Disgust | Disgust |
| Fear | Fear | Fear | Fear | Fear |
| | Anticipation | | Excitement (possibly Anticipation) | |
| | Trust | | | |
| | | Contempt | Contempt | Contempt |
| | | | Calmness | Neutral |
| | | | Boredom | Boredom |
| | | | Awkwardness | |
| | | | Anxiety | |
| | | | Horror | |
| | | | Romance | |
| | | | Sexual desire | |
| | | | Nostalgia | |
| | | | Confusion | |
| | | | Entrancement (possibly amazement) | |
| | | | Amusement | |
| | | | Adoration | |
| | | | Admiration | |
| | | | Awe | |
| | | | Aesthetic appreciation | |
| | | | Craving | |
| | | | Interest (possibly anticipation) | |
| | | | Satisfaction | |
| | | | Relief | |

Other familiar emotions not cited by the specific theories as listed in TABLE 1 above may include, without limitation, vigilance, grief, rage, loathing, ecstasy, etc. In some operational scenarios, the non-cited emotions may be approximately mapped to other corresponding synonyms in the lists of TABLE 1 above. For example, several emotions may be mapped as follow: vigilance ~ interest, grief ~ sadness, rage ~ anger, loathing ~ contempt, ecstasy ~ romance or sexual desire or amazement, etc., where "~" in between two emotions denotes a mapping from the preceding emotion to the subsequent emotion. Sometimes a change in the word for an emotion is just a magnitude change of the same emotion. For example, grief is a stronger amplitude version of sadness.

As used herein, the term "immersiveness" may mean that, while viewing—which, as used herein, may include visually seeing and/or audibly hearing as well as possibly perceiving motion—media content (e.g., audio content, visual content, etc.) as rendered by a playback device, the viewer feels as if actually placed in the world of the story depicted in the media content.

Immersiveness may be achieved through realistic image and audio rendering capabilities in a rendering environment, such as wider field of views (FOV), wider color gamut, increased (luminance) dynamic range, higher bit-precision, higher fidelity positionalized sound, and so forth. By way of comparison, a viewer in a rendering environment with relatively low image and audio rendering capabilities may constantly see an image border from a narrow FOV presentation on a small screen display, thereby being prevented from having a feeling of immersiveness.

Hence, image and audio rendering capabilities may be further improved to avoid or reduce visual or audible distractions that are relatively easily caused by lower image and audio rendering capabilities. However, it should be noted that, while technologically achieved immersiveness and viewer engagement can often go hand-in-hand, the correlation between rendering capabilities and immersiveness is not absolute and does not work for all cases. For example, relatively "low" technological capabilities such as a book could still cause a reader to feel thoroughly immersed in the story depicted in the book if the story were told in the book in a compelling and engaging way. Conversely, relatively high technological capabilities such as a VR game in a high-end professional rendering environment could still fail to engage or cause a game user to feel immersed if the VR game were uninspiringly derivative or boring.

While not explicitly accounted for in the emotions of TABLE 1 above, immersiveness can be of importance to media ecosystems (or rendering environments) and playback devices in many operational scenarios as a magnifier of some or all emotions as identified in TABLE 1. Hence immersiveness need not be directly or separately assessed/ measured/quantified but rather exerts its impact in these operational scenarios by way of detectable, assessible, measurable and/or quantifiable emotions that have been magnified or augmented by immersiveness.

An emotion as described herein may be represented in a variety of ways. In some operational scenarios, an emotion may be represented discretely. For example, an emotion may be characterized or assessed into a specific emotion type (e.g., through face tracking and facial expression analysis, etc.) such as one identified in TABLE 1 above and have various levels of intensity such as five (5) levels, fewer than five (5) levels, or more than (5) levels. The various levels of intensity for the emotion may collapse to neutral at the lowest in physiological state assessment.

In some operational scenarios, an emotion may be characterized or assessed with continuous values. For example, an emotion may be represented or modeled with two Cartesian axes respectively representing arousal and valence. Arousal is essentially a magnitude or level of intensity as discussed above, whereas valence determines whether human feeling in connection with the emotion is positive or negative. For example, a positive value measurement of valence as obtained with one or more physiological monitoring probes or sensors may indicate a positive feeling, whereas a negative value measurement of valence as obtained with the physiological monitoring probes or sensors may indicate a negative feeling.

This coordinate-based emotion modeling can be useful as some physiological measurements and/or assessment obtained through physiological monitoring probes or sensors and corresponding computer-implemented analyses can only identify, quantify, measure and/or assess arousal and valence levels of underlying emotion(s), depending on available physiological monitoring and assessment technologies. GSR is an example in which only arousal and valence of an emotion may be assessed at this point.

Additionally, optionally or alternatively, a system as described herein can operate in conjunction with other types of emotion modeling or representations—such as a standardized model associated with IAPS (interactive affective picture system) for facial emotions. Such emotion modeling or representation nay be used to identify, quantify, measure and/or assess arousal and valence as well as possibly other aspects (e.g., dominance, etc.) for underlying emotion(s).

5. Physiological Monitoring and Assessment

Techniques as described herein can operate with any combination of a wide variety of physiological monitoring and/or assessment technologies to monitor and/or assess the viewer's emotion state, cognition state, etc.

Physiological monitoring devices/sensors/electrodes may include, but are not necessarily limited to only, one or more of: head mounted displays (HMDs) with monitoring devices/sensors/electrodes. monitoring devices/sensors/electrodes around eyes, earbuds with (or in-ear) monitoring devices/sensors/electrodes, EOG devices, EEG devices, eye gaze trackers, gas content monitors, pupillometry monitors, monitoring devices deployed with specific playback devices, monitoring devices deployed with specific rendering environments, and so forth.

Some monitoring/assessment technologies can be incorporated directly on an image display that is a part of a playback device or system, while some other monitoring/assessment technologies can be incorporated through separate, auxiliary, peripheral, smart earbuds and/or smartwatch devices operating in conjunction with a playback device. In a media consumption application with a relatively large audience such as in a cinema or theater, physiological monitoring/assessment technologies ranging from one or more cameras facing the audience, to sensors placed in the seats, to measurements of the overall cinema or theater such as gas content or temperature, etc., may be implemented or used to monitor and/or assess multiple viewers' collective and/or individual emotion states, cognition states, etc.

A system as described herein can generate individual physiological state assessment as well as group physiological state assessment. Example physiological monitoring/assessment techniques include, but are not necessarily limited to only, one or more of: eye gaze tracking via EOG, cognition state via EEG, auditory attention via EEG, emotional and/or narrative state via pupilometry, and so forth.

Physiological state assessment may be broken into two categories or aspects, cognition and emotion, which may be mapped to the narrative information aspect and the emotion expects or effect aspect of the creative intent, respectively, as previously identified. Physiological state assessment of cognition relates to cognitive load, which indicates whether and how much the viewer is struggling to comprehend elements important to the storyline.

Engagement is an internal state of attention important to emotion and cognition. The internal state of attention may, but is not limited to, be measured through eye trackers such as mapping the viewer's gaze position onto specific audio or visual elements in rendered media content. Such eye trackers may be built into an image display (e.g., TV, mobile display, computer monitor, etc.) in a video display application, virtual reality (VR) application, an augmented reality (AR) application, etc.

The viewer's engagement (or internal state of attention) with the depicted story can be (qualitatively and/or quantitatively) assessed with EEG by way of P300 evoked potential responses. A reduction of electric field potential as determined through the P300 evoked potential responses indicates engagement or attention on the part of the viewer than otherwise.

In some operational scenarios, engagement may be considered as a subset of emotion. In these operational scenarios, expected engagement levels (or attention levels) to various visual and/or audio elements rendered by playback devices may be specified in media metadata as emotion expectations metadata.

In some other operational scenarios, rather than being considered as a subset of emotion, engagement (or attention) may be considered as subset of cognition. Expected engagement levels (or attention levels) to various visual and/or audio elements rendered by playback devices may be specified in media metadata as narrative information (or cognition) metadata.

Techniques as described herein can be implemented to support different approaches of classifying, representing and/or measuring emotions and dimensions/levels/intensities thereof. In some operational scenarios, emotions may be monitored, measured and/or assessed (e.g., by way of physiological monitoring devices/sensors/electrodes, etc.) in terms of (e.g., continuous values of, ranges of continuous values of, etc.) valence and arousal. In some operational scenarios, emotions may be monitored, measured and/or assessed (e.g., by way of physiological monitoring devices/sensors/electrodes, etc.) in terms of (e.g., discrete type values of, discrete integer representations of, classifications of, etc.) a set of distinct (albeit related) emotions.

Certain emotions may be read from acquired imagery—such as through visible light, thermal imaging cameras, etc.—of the viewer's face. One or more facial expression methods, algorithms and/or procedures may be used to assess or read the viewer's internal state or emotion through facial expressions captured in the acquired imagery. Reading the viewer's internal state or emotion from thermal images rather than visible light images may provide or afford a relatively deep understanding of the viewer's internal state or emotion than possible with reading visible light images, as visible light images may be masked by a "poker face" of the viewer, whereas the thermal images may not be so easily masked by such "poker face."

To assess non-visible emotions, an electroencephalography (EEG) sensory data collection method may be implemented with a skullcap disposed of electrodes (e.g., dozens of electrodes, just a handful of electrodes, etc.) touching the viewer's head at multiple places. An EEG sensory data collection method may also be implemented through electrodes deployed, embedded and/or disposed with a headband, over-the-ear headphones (or cans), a part of a hat, etc. In some applications such as VR applications and the like, a multi-sensor EEG system or assembly can be built into a head-mounted display (HMD). Also, relatively innocuous ways to collect EEG sensory data can be developed or implemented by way of electrodes placed in smart earbuds.

As previously noted, some of the physiological monitoring/assessment technologies allow for, or support, readings of (e.g., only, with other dimensions such as dominance, etc.) arousal and valence, such as GSR, which also may be referred to as ectodermal activity (EDA), skin conductance, electrodermal response (EDR), psychogalvanic reflex (PGR), skin conductance response (SCR), sympathetic skin response (SSR), skin conductance level (SCL), or the like. Heart-rate and respiration monitoring are physiological monitoring/assessment examples that can (e.g., only, etc.) monitor or assess arousal levels of underlying emotions.

6. Metadata Control and Physiological Monitoring

Media rendering operations as described herein may be under metadata control. As previously noted, media metadata may be inserted and/or embedded with corresponding media content in a coded bitstream, a media file, etc., that is transmitted and/or delivered to downstream recipient devices such as playback devices. The media metadata may include metadata portions such as those generated for Dolby Vision, Samsung's HDR10+, Technicolor Advanced HDR, Dolby ATMOS, etc. Some or all the media metadata can be inserted and embedded with the media content in the coded bitstream, media file, etc. A recipient playback device may use the media metadata to adapt or alter (luminance) dynamic range, color saturation, hue, spatial filtering, etc., in relation to an actual image display in a target environment and use the audio metadata to alter audio rendering/reproduction with an actual audio speaker/channel configuration deployed in the target environment.

The media metadata further comprise E&N metadata such as expected emotion states, expected cognitive states (e.g., cognitive loads, etc.), content modification metadata, and the like. Emotional expectations metadata in the E&N metadata may be used to describe a set of emotions as listed in TABLE 1 above or a set of emotional dimensions such as arousal and valence. In some operational scenarios, Some or all emotions in the set of emotions described in the emotional expectations metadata can be monitored, measured, estimated, determined and/or assessed using facial expression extraction technologies. Some or all emotions in the set of emotions described in the emotional expectations metadata can be monitored, measured, estimated, determined and/or assessed using EEG, pupilometry, other physiological state assessment techniques such as thermal and GSR, combinations of different physiological state assessment techniques, and so forth.

In a media content and metadata production stage, not all emotions as listed in TABLE 1 above need to be used, included and/or described in the emotional expectations metadata. In a media consumption stage (e.g., implemented with playback devices), not all emotions need to be monitored, measured, estimated, determined and/or assessed by a media playback device. Some emotions may be more applicable in a specific rendering environment with a specific playback device than others. Some emotions may be more applicable to a specific viewer than others.

It should be noted that different technology fields or disciplines may use different terms of art that are synonymous or have substantial overlap in meaning. Some terms of art tend to be used by creatives (or creators of media content), whereas some other terms of art tend to be used neuroscience professionals or experts. As compared with colloquial terms or usages, terms of art can have advantages of specificity in a discipline or field. Terms most appropriate to those interacting with each particular portion of a system implementing techniques as described herein are used in this document. Thus, for steps involving the insertion of metadata, as would be done by creatives in the media production stage, terms more familiar to the creatives are used. By comparison, for steps involving processing of physiological signals, terms more appropriate to neuroscience are used.

An example term with overlapping meanings is a term "confusion", which is related to cognition state and confusion estimate. The term "confusion" is a more appropriate term to use with creatives, while the term "cognitive load" with overlapping meaning is a more appropriate term to use with neuroscientists who may use the latter term to describe or indicate a level of confusion. As a term of art, cognitive load has additional specificity in neuroscience as the term includes gradations from very stressed confusion to mental states simply requiring attention.

7. Content and Metadata Production and Consumption

Figure 2A:
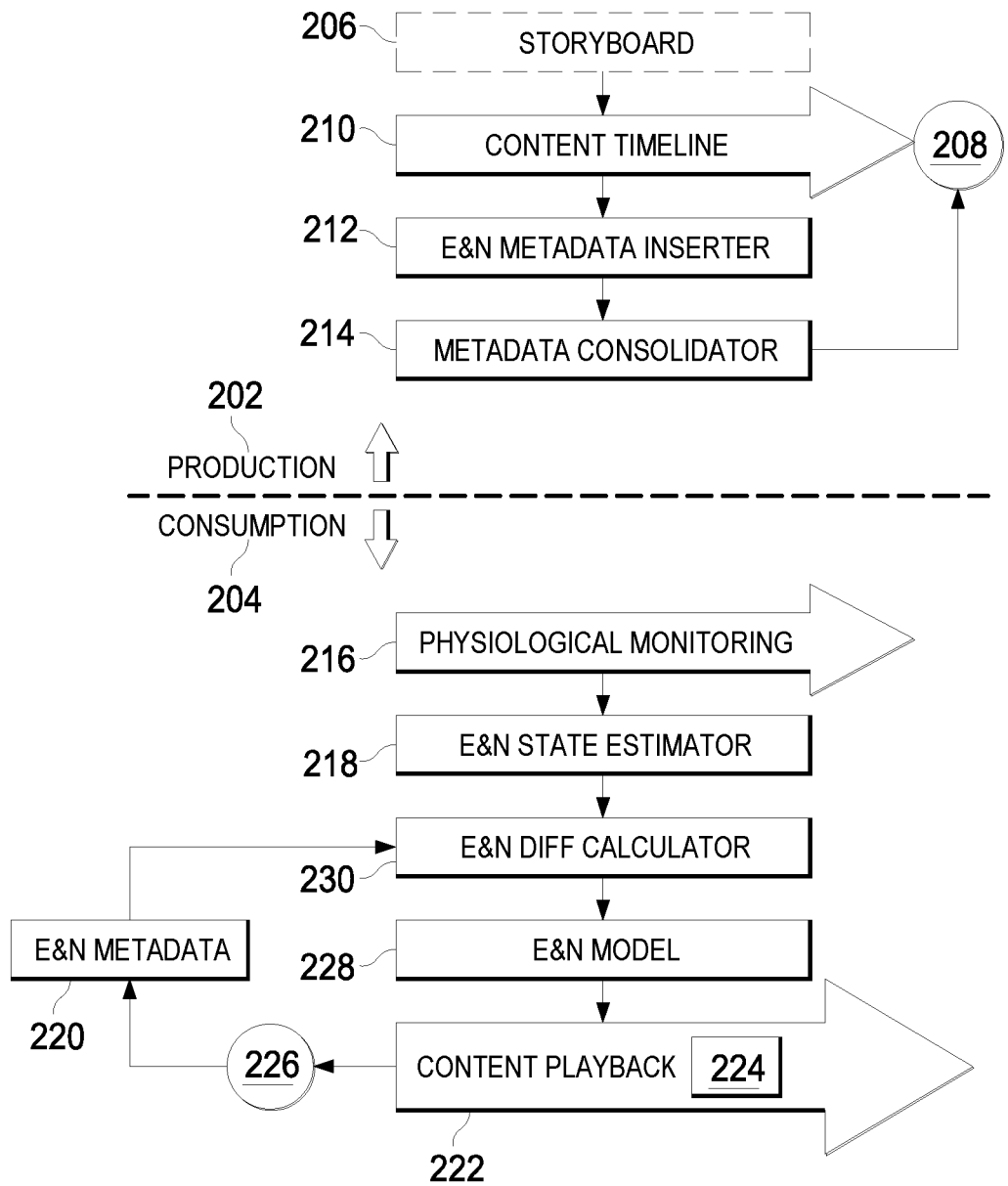
FIG. 2A through FIG. 2C illustrate example production and consumption stages.

FIG. 2A illustrates an example production stage 202 in which media metadata is generated for corresponding media content and an example consumption stage 204 in which the generated media metadata is used along with physiological monitoring and assessment to support creative intent scalability when the media content is rendered across different playback devices.

A media production block (e.g., 115 of FIG. 1A, etc.) generates the media content (e.g., 117-2 of FIG. 1A, etc.) with an (expected) content timeline 210 illustrated in FIG. 2A as a unidirectional arrow along the positive or incrementing direction of time. The media content (117-2) is composed of a plurality of data portions such as a plurality of audio frames, a plurality of image frames, etc. The content timeline (210) indicates a timeline along which the plurality of data portions in the media content is expected to be played back by playback devices. More specifically, each data portion in the plurality of data portions may be designated (e.g., by the creatives, etc.) to be played back by various playback devices in a specific timepoint in a plurality of time points along the content timeline (210). It should be noted that an actual playback timeline as implemented by a specific playback device may to some extent deviate from or fluctuate around the expected content timeline (210) by clock drifts, clock differences, user or device actions (e.g., pause, fast forward, rewind, reload, etc.), etc., existing in an actual rendering of the media content (117-2).

In the production stage (202), the media production block (115) or an E&N metadata inserter 212 therein can interact with the creatives (e.g., those in the production staff, etc.) to obtain user input provided by the creatives through one or more user interfaces. The user input describes emotion expectations and narrative information (e.g., key points, etc.) for one or more data portions of the media content (117-2).

Additionally, optionally or alternatively, in the production stage (202), the media production block (115) accesses a storyboard 206 that contains narrative information (e.g., digitized story information, etc.) and emotional expectations for data portions in the media content (117-2). The storyboard (206) provides a relatively high level map or description of one or more media programs represented in the media content (117-2). When made available, the storyboard (206) can be processed by the media production block (115) to extract narration information, emotion expectations, main characters, regions of interest, storyline connectivity, etc., relating to the media content (117-2).

Based at least in part on the narrative information and emotional expectations received from the user input and/or extracted from the storyboard (206), the media production block (115) generates one or more metadata portions of media metadata (e.g., 117-1 of FIG. 1A, etc.) for the media content (117-2). The one or more metadata portions in the media metadata (117-1) may comprise one or more E&N metadata portions describing emotion expectations (e.g., expected arousal level, expected valence level, other emotion dimensions to be expected, etc.) and narrative key points (e.g. expected cognition states, expected engagement or levels of attention, etc.) for one or more data portions in a plurality of data portions of the media content (117-2). Additionally, optionally or alternatively, the one or more E&N metadata portions in the media metadata (117-1) may comprise zero or more content modification metadata portions indicating or identifying sound or visual elements in data portion(s) of the media content (117-2) as AOIs or ROIs. Additionally, optionally or alternatively, the media metadata (117-1) may comprise relatively low level audio metadata, image metadata, and so forth.

Metadata generation as described herein can be repeatedly performed for data portions of the media content (117-2) throughout the content timeline (210). The media production block (115) or a metadata consolidator 214 therein can consolidate, format and bind/multiplex various metadata portions of the media metadata (117-1) with corresponding data portions of the media content (117-2) in a coded bitstream (e.g., 122 of FIG. 1A, etc.) by way of metadata-to-content binding operations 208 (e.g., performed by a coding block 120 of FIG. 1A, etc.).

The consumption stage (204) implements or includes, but is not necessarily limited to only, two (e.g., main, key, etc.) time-dependent processes. Steps in the two time-dependent processes are performed by a playback device (or devices operating in conjunction therewith) while the media content (117-2) is being adjusted and rendered by the playback device to either a solo viewer or an audience with multiple viewers.

The first of the two time-dependent processes in the consumption stage (204) includes physiological monitoring 216 of a viewer (the above-mentioned solo viewer or a viewer in the above-mentioned audience) or of a multi-viewer audience (e.g., through aggregated audience responses, etc.) along the content timeline 210 as specified in the production stage (202) and further implemented by the playback device. The physiological monitoring (216) of the viewer is ideally continuous in time but may be sampled either finely or coarsely depending on physiological monitoring components operating with the playback device in a rendering environment.

The playback device or an E&N state estimator 218 therein processes physiological monitoring signals from the physiological monitoring (216) of the viewer and uses the physiological monitoring signals to estimate or assess the viewer's E&N state in relation to already rendered data portions of the media content (117-2). In an example, the viewer's assessed E&N state may represent an assessed emotion that is described by one or more emotional dimensions such as arousal, valence, dominant emotion etc. In another example, the viewer's assessed E&N state may represent an assessed cognition state that indicates how effective narrative information (e.g., key points, etc.) in the already rendered data portions of the media content (117-2) is being conveyed or understood by the viewer.

The second of the two time-dependent processes in the consumption stage (204) includes content playback 222 and modification 224 of the media content (117-2) along the same content timeline (210) as specified in the production stage (202) and further implemented by the playback device.

As a part of the content playback (222), the playback device performs a metadata extraction operation 226 (e.g., as a part of a decoding/demultiplexing block 130 of FIG. 1A, etc.) to extract some or all of various metadata portions of the media metadata (117-1) bound with corresponding data portions of the media content (117-2) from the coded bitstream (122).

For a specific time point at which a data portion of the media content (117-2) is to be rendered to the viewer, an E&N difference calculator 230 of the playback device receives the viewer's assessed E&N state as estimated from the E&N state estimator (218). The E&N difference calculator (230) also accesses or receives an E&N metadata portion—in the media metadata (117-1) encoded with the coded bitstream (122)—corresponding to the data portion of the media content (117-2) and use the E&N metadata portion to determine the viewer's expected E&N state for the same time point.

The E&N difference calculator (230) determines a difference between the viewer's expected E&N state and the viewer's assessed E&N state. For example, if the viewer's expected E&N state and the viewer's assessed E&N state pertain to the viewer's emotion state, the E&N difference calculator (230) determines a difference between the viewer's expected emotion state as indicated by the viewer's expected E&N state and the viewer's expected emotion state as indicated by the viewer's assessed E&N state. On the other hand, if the viewer's expected E&N state and the viewer's assessed E&N state pertain to the viewer's cognition state, the E&N difference calculator (230) determines a difference between the viewer's expected cognition state as indicated by the viewer's expected E&N state and the viewer's expected cognition state as indicated by the viewer's assessed E&N state.

The difference between the viewer's expected E&N state and the viewer's assessed E&N state can then be provided as input to an E&N content modification model 228 and used to generate output from the E&N content modification model (228) in the form of a content modification 224 to the data portion of the media content to be rendered to the viewer for the given time point. The content modification (224) may be a zero (or null) modification if the difference is no more than an E&N state difference threshold (e.g., a valence difference threshold, an arousal difference threshold, an attention level difference threshold, etc.). The content modification (224) may be a non-zero (or non-null) modification if the difference is more than the E&N state difference threshold. A magnitude and/or type of the content modification (224) may be qualitatively or quantitatively dependent on the difference between the expected E&N state and the assessed E&N state.

The foregoing steps (or operations) may be repeated for each of the other data portions of the media content (117-2) to be rendered at other time points of the content timeline (210) as specified in the production stage (202) and implemented in the consumption stage (204).

Ineffectiveness of the already rendered portions of the media content to minimize the divergence between the assessed and expected state(s) may be indicated or measured by a relatively large discrepancy (e.g., arousal difference over a arousal difference threshold, valence difference over a valence difference threshold, deviating types of emotions detected through facial expression analysis, etc.) between the viewer's expected E&N states as determined or extracted from the E&N metadata (220) and the viewer's assessed E&N states as determined or estimated through the physiological monitoring (216). The expected E&N states can be used by a system as described herein as emotion and narrative goals for feedback-based control processing to minimize the divergence.

The E&N content modification model (228) can be used to generate output based on differences between the viewer's expected E&N states and the viewer's assessed E&N states. The generated output may comprise media content modifications (or modifications to signals driving audio or image rendering operations) for data portions to be rendered along the content timeline (210). The media content modifications are specifically implemented to reduce any detected ineffectiveness of already rendered data portions of the media content (117-2) as measured in relation to the creative intent (e.g., emotion expectations, narrative states, attention loci, etc.) described or embodied in the E&N metadata (220).

Figure 2B:
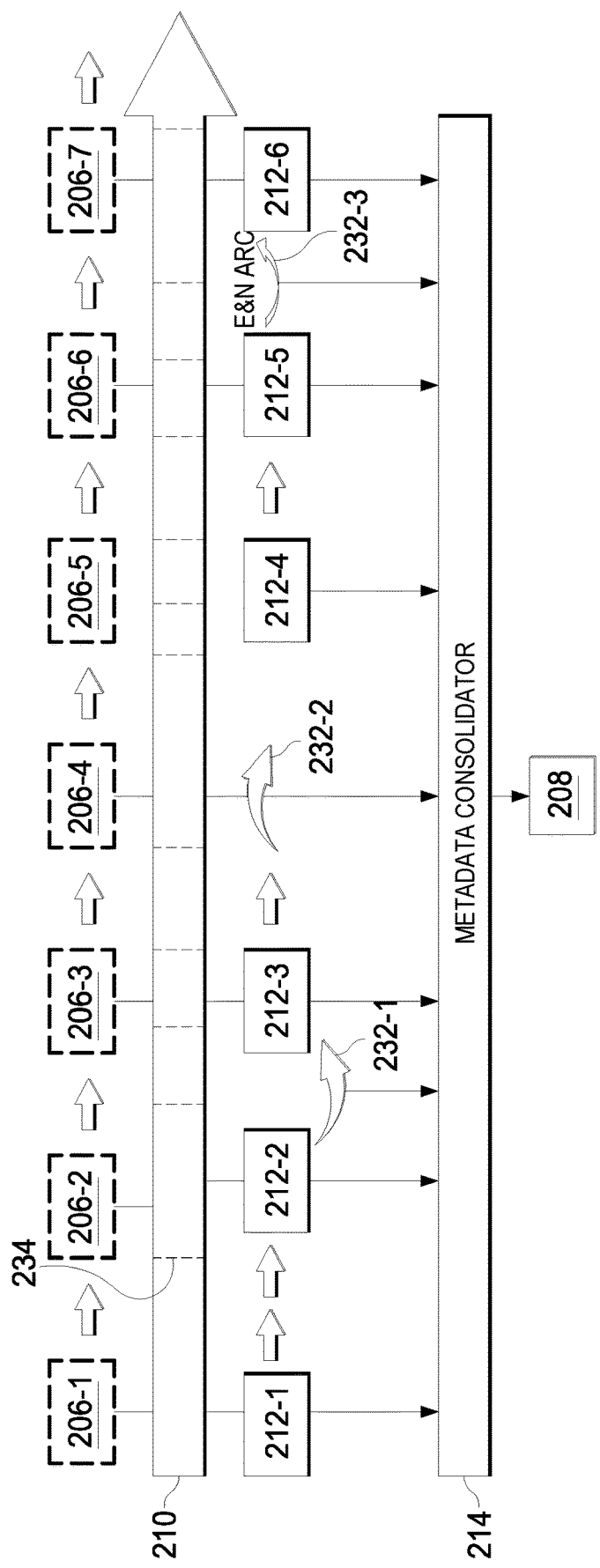

FIG. 2B illustrates an example media content and metadata production stage (e.g., 202 of FIG. 2A, etc.). As shown, a storyboard (e.g., 206 of FIG. 2A or FIG. 2B, etc.) contains a plurality of individual storyboard pages 206-1 through 206-7 aligned with a plurality of individual time points or intervals along a content timeline (e.g., 210 of FIG. 2A or FIG. 2B, etc.). An E&N metadata inserter (e.g., 212 of FIG. 2A or FIG. 2B, etc.) interacts with the creatives of media content (e.g., 117-2 of FIG. 1A, etc.) to receive user input that describes emotion expectations and narrative information (e.g., key points, etc.) for one or more data portions of the media content (117-2). As shown in FIG. 2B, the emotion expectations and narrative information as described in the user input comprises a plurality of content timelines edits (e.g., one of which may be 234 of FIG. 2B, to indicate beginning or ending of scenes, etc.), a plurality of key moments 212-1 through 212-6 and arcs 232-1 through 232-3 (e.g., key moments in scenes, emotion expectations for a viewer, narrative key points to be conveyed to a viewer, etc.) in a story depicted in the media content (117-2), and so forth.

As illustrated, each individual content timeline edit corresponds to a respective timepoint or interval along the content timeline (210). Likewise, each key moment and arc corresponds to a respective timepoint or interval along the content timeline (210).

In some operational scenarios, there may be many more edits than storyboard pages. Furthermore, the edits and storyboard pages may or may not align along the content timeline (210). Additionally, optionally or alternatively, media metadata portions 212-1 through 212-6 in media metadata (e.g., 117-1 of FIG. 1, etc.) may (e.g., only, etc.) be inserted into or bound with the media content (117-2)—in a content playback file, a video signal, a coded bitstream (e.g., 122 of FIG. 1A, etc.), and the like—by a metadata consolidator (e.g., 214 of FIG. 2A or FIG. 2B, etc.) during key scenes between the edits.

Figure 2C:
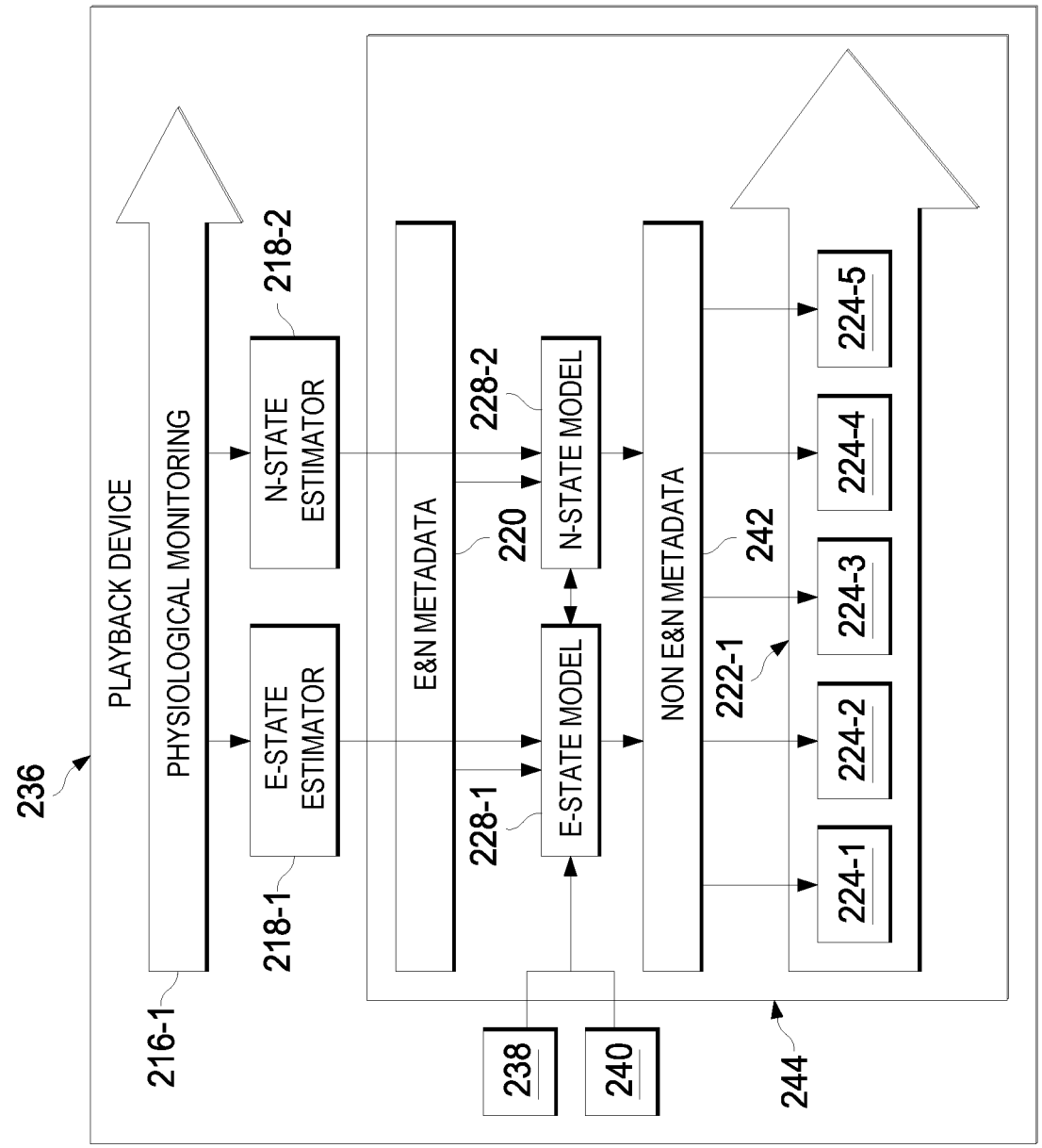

FIG. 2C illustrates an example media content and metadata consumption stage (e.g., 204 of FIG. 2B, etc.). In this stage, signals for physiological monitoring 216-1 may be generated by components (e.g., electrodes, sensors, cameras operating with facial expression analysis software, etc.) while the media content (117-2) is being adjusted and rendered by a playback device 236 to a viewer. In some operational scenarios, some or all the physiological monitoring components are configured or included as a part of the playback device (236). In some other operational scenarios, some or all the components for the physiological monitoring (216-1) are configured or deployed standalone or separate from the playback device (236) and are operating in conjunction with the playback device (236). The physiological monitoring components provide or transmit the physiological monitoring signals to the playback device (236) for physiological state assessment with respect to the viewer.

As illustrated in FIG. 2C, an E-state estimator 218-1 and an N-state estimator 218-2 implement an emotional state estimation model and a cognitive state (or cognitive load) estimation model respectively, use the physiological monitoring signals as input to the estimation models, and convert the received physiological monitoring signals to (assessed) emotional states and cognitive states of the viewer as output from the estimation models while the media content (117-2) is being adjusted and rendered by the playback device (236) to the viewer.

In the meantime, the playback device (236) receives or continues receiving (to-be-rendered portions of) the media metadata (117-1) with the media content (117-2). E&N metadata 220 in the media metadata (117-1) may be used by the playback device (236) to obtain the viewer's expected emotional states and cognition states at various time points in content playback 222-1.

The (assessed) emotional states and cognitive states of the viewer outputted from the emotional state estimation model and/or cognitive state estimation model are used as feedback, along with the expected emotional states and cognitive states specified in the media metadata (117-1), to help perform realtime content playback and modification operations 244. Some or all these content playback and modification operations (244) can be implemented as a time-dependent process by the playback device (236).

In some operational scenarios, to perform the content playback and modification operations (244), the playback device (236) implements an emotional state content modification model 228-1 and a cognitive state content modification model 228-2, uses the viewer's assessed and expected emotional states and cognition states as input to the content modification models (228-1 and 228-2), generates differences between the expected and assessed states, and uses the differences (or divergence between the expected states in accordance with the creative intent and the actual states) to generate relatively high-level modification signals as output from the content modification models while the media content (117-2) is being modified and rendered by the playback device (236) to the viewer.

The high-level modification signals outputted from the content modification models (228-1 and 228-2) may be converted into selected content modification signals 224-1 through 224-5 based at least in part on non E&N metadata 242 of the media metadata (117-1) such as relatively low level signal domain metadata carrying operational parameters for audio or image processing operations.

The selected content modification signals (224-1 through 224-5) act on the media content (117-2) at different time points of the content playback (222-1) and cause specific content modifications to be made to the media content (117-2) during the content playback (222-1) for the purpose of minimizing the divergence between the creative intent and the viewer's assessed states. The specific content modifications to the media content (117-2) may be media content adjustments or modifications involving some or all the AOIs or ROIs identified in the non-E&N metadata (242) to cause the viewer's physiological state to move toward experiencing expected emotions or to understand key points in the story depicted by the media content (117-2), as intended by the creatives. A signal modification (any of 224-1 through 224-5) as described herein may be generally held constant, vary relatively smoothly, or may vary within an applicable time interval (e.g., between the creatives' edits, etc.).

Additionally, optionally or alternatively, playback device characterization data 238 and/or ambient environment characterization data 240 may be used in the content playback and modification operations (244) of the playback device (236). The playback device characterization data (238) and/or ambient environment characterization data (240) can be made accessible to or stored locally (e.g., configuration data or file, capability data or file, static metadata, configurable metadata, etc.) at the playback device (236). The playback device characterization data (238) relates to or describes audio and video processing capabilities and/or limitation of the playback device (236), including but not limited to, one or more of: type of (e.g., small, home-based, cinema-based, etc.) playback device, (luminance) dynamic range, color gamut, spatial resolution of image displays operating with playback devices, bit depths of media signals supported, number, configuration, frequency ranges, and/or frequency/phase distortions, of speakers used for audio rendering/transduction, positional rendering capability, etc. The ambient environment characterization data (240) relates to or describes characteristics of a rendering environment in which the playback device (236) is operating, including but not limited to, one or more of: physical size, geometry and/or characteristics of rendering environment, ambient sound, ambient illumination, white noise level, characteristics of clutter in visual environment, etc.

8. Emotional Expectations and Narrative Metadata Format

Figure 2D:
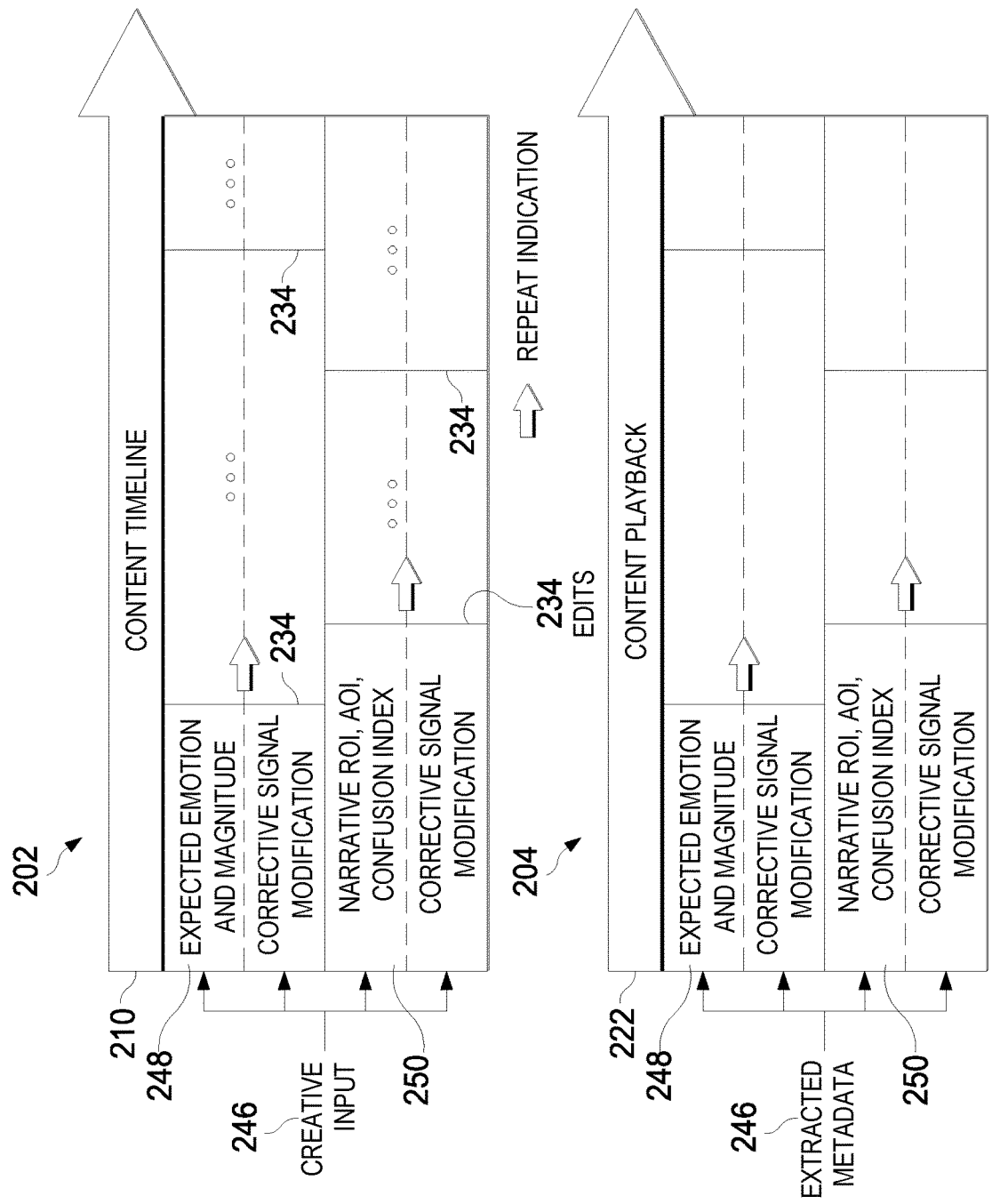
FIG. 2D illustrates example emotion expectations metadata and narrative metadata.

FIG. 2D illustrates example E&N metadata generated based on creative input 246 in a content and metadata production stage (e.g., 202, etc.) and used at content playback (e.g., 222, etc.) in a content and metadata consumption stage (e.g., 204, etc.).

In the production stage (202), various E&N metadata portions comprising E-state metadata portions 248 and N-state metadata portions 250 may be generated based on the creative input (246) at a plurality of timepoints for a plurality of time interval along an expected audiovisual content timeline (e.g., 210, etc.). The E-state metadata portions (248) and the narrative metadata portions (250) may or may not be aligned timewise along the content timeline (210). Start and end positions of a specific metadata portion of the E-state metadata portions (248) and the narrative metadata portions (250) may be set, configured or specified, for example by content timelines edits (e.g., 234, etc.) as provided in the creative input (246).

In the content playback (222) of the consumption stage (204), some or all the E&N metadata portions comprising the E-state metadata portions (248) and The narrative metadata portions (250) may be extracted and used with physiological monitoring and assessment to generate media content adjustments or modifications as necessary along a playback timeline—e.g., the content timeline as implemented by a playback device in the content playback (222—to convey the creative intent of corresponding media content (e.g., 117-2 of FIG. 1A, etc.) for which the E&N metadata is generated in the production stage (202).

As shown in FIG. 2D, the E&N metadata is broken down into the E-State metadata portions (248) and the narrative metadata portions (250) respectively comprising data fields or containers for emotion and (e.g., separate, etc.) data fields or containers for narrative information. The data fields or containers for emotion in the E-State metadata portions (248) are subdivided into expected states (e.g., expected emotion and magnitude, etc.) and intended modifications (e.g., corrective signal modification(s), etc.). Likewise, the data fields or containers for narrative information in the narrative metadata portions (250) are subdivided into expected states (e.g., narrative ROI, AOI, confusion index, etc.) and intended modifications (e.g., corrective signal modification(s), etc.).

The narrative metadata portions (250) may be specified at one of a variety of different abstraction levels ranging from a relatively high level such as semantic level to a relatively low level such as specific image regions of interest (tracked per frame or across the scene), audio objects of interest, a confusion index, and so forth.

The confusion index is expected to be sparsely used but inserted as metadata when corresponding (e.g., critical, key, main, etc.) storyline information is to be (e.g., fully, completely, well, etc.) understood by a viewer. The confusion index may be set to distinguish intended confusion such as a chaotic action scene from unwanted confusion of the (e.g., critical, key, main, etc.) storyline information. The confusion index is present for a given time point or for a given time interval of the content timeline (210) when needed, and audio or visual objects associated with (e.g., identified as an object of interest in) the metadata need not persist (e.g., if they are not used, etc.).

In some operational scenarios, an E-state or N-state metadata portion may be inserted at an edit junction (e.g., preceding a scene, preceding a media content portion, etc.) and persist across a media content portion such as video or audio frames until the next edit junction (e.g., preceding the next scene, preceding the next media content portion, etc.). In some operational scenarios, flags are made available (e.g., in a coded bitstream, in a metadata portion, in a header of audio or visual frame, etc.) to signal to a playback device to continue using information as specified in previously received metadata portions for the purpose of avoiding incurring overhead bits of carrying repetitive metadata per frame. A flag or metadata portion inserted at the beginning or middle of a scene may be persisted to next scene. A flag or metadata portion may be inserted at frame level, scene level, subdivision-of-scene level, sequence level, etc. For example, in some operational scenarios, edit junctions demarcating different media content portions and/or different metadata portions can be at the frame resolution if needed. Additionally, optionally or alternatively, a ramp or transition period between different values of a flag or a data field may be implemented in media content. Additionally, optionally or alternatively, corrective signal modification options may be included as a part of one or more E-state or N-state metadata portions as described herein.

9. Signal Segregation and Fusion

Figure 2E:
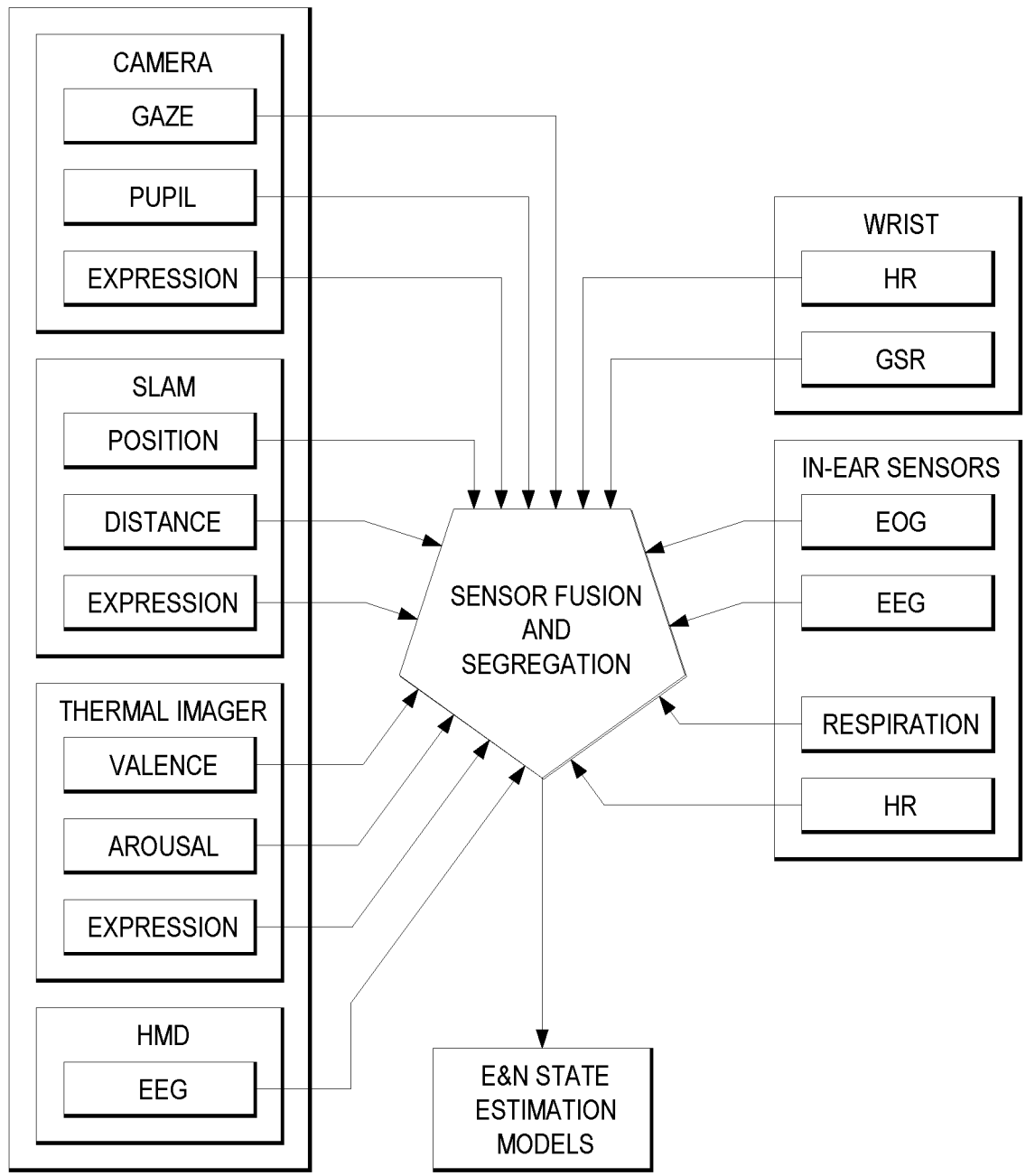
FIG. 2E through FIG. 2G illustrate example physiological monitoring and assessment.
Figure 2F:
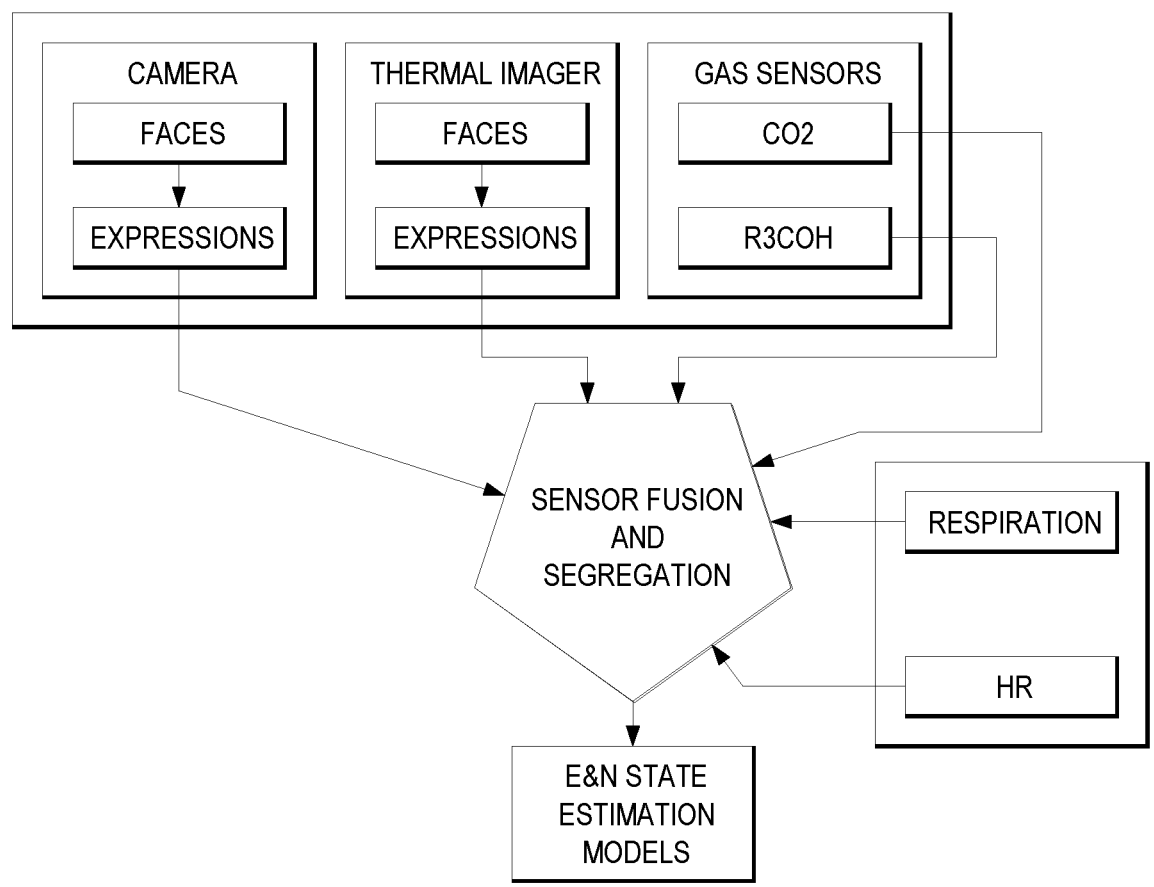

FIG. 2E illustrates example physiological monitoring and assessment for an audience with a solo viewer. Physiological monitoring components or sensors may be configured with or placed at various locations such as (e.g., handheld, etc.) image displays, earbud devices, smartwatch devices, TVs, etc. Each of these locations afford or provides a certain array of sensing. In some embodiments, a playback device (e.g., 236 of FIG. 2C, etc.) comprises an image display and an audio or sound source, which may be wirelessly connected with an earbud device. A smartwatch may or may not be a part of the playback device and may be considered or configured as auxiliary components operating with the playback device.

As shown in FIG. 2E, the physiological monitoring sensors for the solo viewer may include one or more of: display-based sensors such as visible wavelength camera sensor(s), structured light or SLAM (simultaneous localization and mapping) sensor(s), thermal imager(s), HMD sensor(s), etc.; in-ear sensor(s), wrist sensor(s); and so forth.

The visible wavelength camera sensor(s) may be used to monitor the viewer's gaze position, pupil diameter, facial expression, etc. The structured light or SLAM sensor(s) may be used to monitor the viewer's head position, viewing distance, facial expression, etc. The thermal imager(s) may be used to monitor the viewer's valence, arousal, facial expression, etc. The HMD sensor(s) may be used to generate an EEG-based physiological monitoring signal with respect to the viewer. The in-ear sensor(s) such as electrodes, thermal sensors, optical sensors, etc., may be used to generate EOG-based (e.g., for gaze position monitoring purposes, etc.), EEG-based, respiration-based and/or plethysmography-HR-based physiological monitoring signals with respect to the viewer. The wrist sensor(s) may be used to generate HR-based and/or GSR-based physiological monitoring signals with respect to the viewer.

A (pentagon-shape) sensor-fusion-and-segregation block as shown in FIG. 2E can serve to process physiological monitoring signals from some or all the physiological sensors. The sensor fusion and segregation block may be implemented with one or more models (e.g., algorithms, methods, procedures, operations, etc.) for converting the received physiological monitoring signals to emotional states and cognitive states.

Figure 2G:
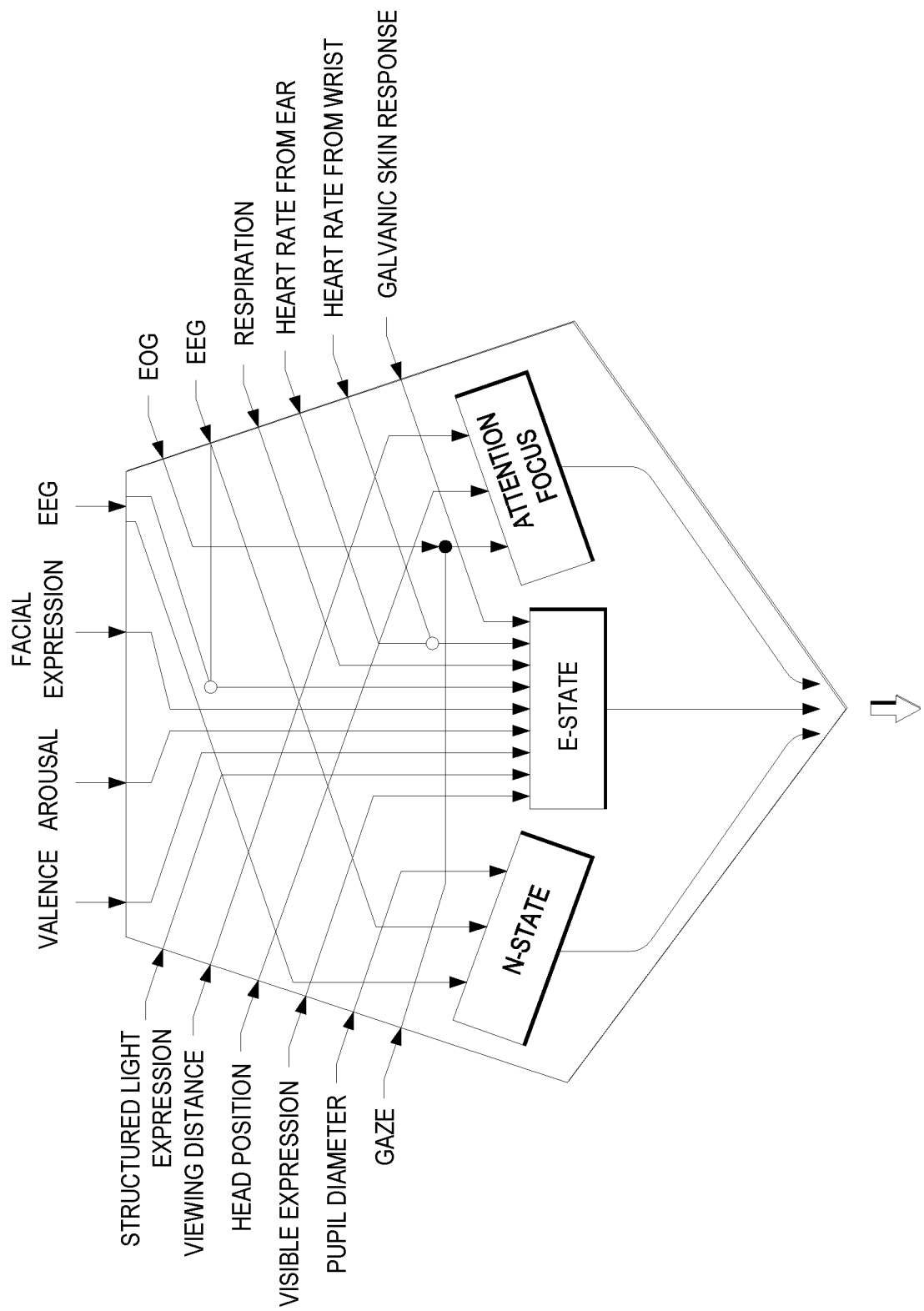

The sensor-fusion-and-segregation block segregates the received physiological monitoring signals into different groups of physiological monitoring signals. These different groups of physiological monitoring signal may be used to evaluate different types of states. For example, as illustrated in FIG. 2G, a first group of physiological monitoring signals may be used to estimate or assess one or more E-states, a second group of physiological monitoring signals may be used to estimate or assess one or more N-states, a third group of physiological monitoring signals may be used to estimate or assess the viewer's attentional locus, a fourth group of physiological monitoring signals may be used to estimate or assess some or all of the foregoing physiologically observable aspects of the viewer, and so forth.

The sensor-fusion-and-segregation block combines or consolidates similar or duplicate physiological monitoring signals (in the received physiological monitoring signals) into an overall physiological monitoring signal. Several overall physiological monitoring signals may be generated or produced by the sensor-fusion-and-segregation block from all the received physiological monitoring signals.

In an example, signals generated with multiple different types of physiological monitoring technologies, components or sensors may be combined or consolidated into an overall physiological monitoring signal for face expression analysis. In another example, signals generated with multiple different types of physiological monitoring technologies, components or sensors may be combined or consolidated into an overall physiological monitoring signal for heart rate measurement or determination.

The state estimation models implemented in the sensor-fusion-and-segregation block, as previously mentioned, may include a cognitive state estimation model (or a narrative transfer estimation model) used to determine how effective narrative information deemed to be important by the creatives has been transferred or conveyed to the viewer. The narrative information to be transferred from media content as described herein to the viewer may include, but is not limited to, one or more of: information in a depicted scene (e.g., a shoe left in a crime scene, etc.), a dialog between characters, an image region of interest, an audio or acoustic object of interest, etc. Narrative transfer—or narrative information effectively transferred to a viewer for the purpose of understanding the storyline depicted in the media content—may be measured with engagement, attention locus, eye gazes, attendant emotional responses, etc. In some operational scenarios, the viewer's cognition state comprises two separate key elements of narrative transfer assessment, which is the viewer's cognitive load and the viewer's attentional locus (to what the viewer is paying attention to).

Attention can be considered a subset of cognition. In some operational scenarios, attention-based physiological monitoring and content adjustment processes are collapsed into, or implemented as a part of, cognition-based processes or processing blocks; thus, attention is included as a part of narrative state in the creative intent. In some operational scenarios, attention-based physiological monitoring and content adjustment processes are at least in part separate from cognition-based processes or processing blocks; thus, attention can be a standalone aspect in the creative intent in addition to emotional and narrative states.

In some rendering environments, the viewer's attention locus or location of attention may be determined using sensors that monitor the viewer's attention to a visual object by way of gaze tracking or pupil direction monitoring signals generated by these sensors in correlation or in synchronization with the rendering of the visual object such as an ROI. In some operational scenarios, the viewer may be paying attention to an image region or motion activities outside the viewer's perifovea; thus, the viewer's gaze may not coincide with the attention locus.

Additionally, optionally or alternatively, the viewer's attention locus may also be detected by non-gaze tracking monitoring sensors. For instance, the viewer's attention locus or location of attention may be determined using brain electric activity monitoring sensors that monitor the viewer's attention to an audio object, a moving object outside the viewer's perifovea, etc., by way of EOG and/or EEG monitoring signals generated by these sensors in correlation or in synchronization with the rendering of the audio object, the image object outside the viewer's perifovea, etc.

In some embodiments, the viewer's cognition state estimated for a given time point includes a cognitive load on the part of the viewer for the given time point and a locus or region—e.g., an image region of image rendering of the media content (117-2), a sound field region in a sound field of audio rendering of the media content (117-2)—to which the viewer is paying attention.

Thus, the sensor-fusion-and-segregation block can generate the viewer's emotional states, cognition states (or a narrative transfer states), etc., at various time points while media content (e.g., 117-2 of FIG. 1A, etc.) is being adjusted and rendered to the solo viewer by the playback device (e.g., 236 of FIG. 2C, etc.) based on the received physiological monitoring signals as processed with the signal segregation and consolidation operations using the estimation models.

FIG. 2F illustrates example physiological monitoring and assessment for a group audience. The group audience may include, but are not necessarily limited to only, a large audience in a theater or a small group of one or more viewers in a room or space at home. Physiological monitoring components or sensors can be configured with or placed at various locations in the overall room or venue such as seats, TVs, etc., to monitor some or all of the viewers in the audience collectively and/or concurrently.

As shown in FIG. 2F, the physiological monitoring sensors for the group audience may include room-based sensors such as visible wavelength camera sensor(s), thermal imager(s), gas sensor(s), etc.; seat-based sensor(s); and so forth. The visible wavelength camera sensor(s) and/or the thermal imager(s) can be disposed in a position facing the audience and used to locate group audience members' faces, monitors the group audience's facial expressions, and generate facial expression group statistics including but not limited to the group audience's overall E&N states. The gas sensor(s) can be used to monitor $CO_2$ (e.g., to determine arousal indicated by $CO_2$ content, etc.) and $R_3COH$ (e.g., to determine whether a viewer is likely in a drunk state watching a comedy and make dialog crisp for such viewer, etc.) gas levels in the rendering environment to monitor the group audience's respirations and intoxication levels (if any, which may affect cognition as well as emotion). The seat-based sensor(s) can be disposed with individual seats on which individual group audience members sit and used to generate respiration-based and/or plethysmography-HR-based physiological monitoring signals with respect to the group audience.

Similar to what previously shown in FIG. 2E, in the case of group audiences, a (pentagon-shape) sensor-fusion-and-segregation block as shown in FIG. 2F is used to process physiological monitoring signals from some or all the physiological monitoring sensors. The sensor fusion and segregation block may implement or use one or more models (e.g., algorithms, methods, procedures, operations, etc.) for converting the received physiological monitoring signals to emotional states and cognitive states. The sensor-fusion-and-segregation block segregates the received physiological monitoring signals into different groups of physiological monitoring signals. These different groups of physiological monitoring signal may be used to evaluate different types of states. The sensor-fusion-and-segregation block combines or consolidates similar or duplicate physiological monitoring signals (in the received physiological monitoring signals) into an overall physiological monitoring signal (e.g., among several overall signals generated from all the received signals, etc.).

As in the case of single-viewer audiences, the state estimation models implemented in the sensor-fusion-and-segregation block in the case of group audience may also include a cognitive state estimation model (or a narrative transfer estimation model) used to determine how effective narrative information deemed to be important by the creatives has been transferred or conveyed to the group audience. In some embodiments, the group audience's cognition state estimated for a given time point includes a cognitive load on the part of the group audience for the given time point and a locus or region—e.g., an image region of image rendering of the media content (117-2), a sound field region in a sound field of audio rendering of the media content (117-2)—to which the group audience is paying attention.

Thus, the sensor-fusion-and-segregation block can generate the group audience's emotional states, cognition states (or a narrative transfer states), etc., at various time points while media content (e.g., 117-2 of FIG. 1A, etc.) is being adjusted and rendered to the group audience by the playback device (e.g., 236 of FIG. 2C, etc.) based on the received physiological monitoring signals as processed with the signal segregation and consolidation operations using the estimation models.

FIG. 2G further illustrates example sensor fusion and segregation for a solo viewer audience. It should be noted that some or all of this description is similarly applicable or readily extendable to cover a group audience with one or more viewers.

Physiological monitoring signals from different sensors or components as illustrated in FIG. 2E can be used to estimate or assess the viewer's emotional state such as valence and arousal as well as the viewer's cognition state indicating ongoing success of narrative transfer.

Sensors from a given component of the playback device can contribute physiological monitoring signals to be used in assessing some or all of the viewer's emotional state, cognitive load, and attentional locus. There may be duplication from differing sensors on a given state estimate, such as eye gaze position via a display-based camera as well as from the EOG signal from an earbud. These multiple signals can be consolidated as shown in FIG. 2G with solid and hollow circles.

TABLEs 2 and 3 below illustrate example lists of physiological monitoring signals in terms of their physical locations, types of sensors, and types of estimators that use the physiological monitoring signals. By way of example but not limitation, TABLE 2 contains sensors as illustrated in FIG. 2E for a solo audience, whereas TABLE 3 contains sensors as illustrated in FIG. 2E for a group audience.

TABLE 2

| Physiological Monitoring Signal | Location | Sensor | Estimator |
| --- | --- | --- | --- |
| Gaze position | Display (e.g., | Visible wavelength camera | Attentional locus |
| Pupil diameter | Display | Visible wavelength camera | Attentional locus & Cognitive load |
| Facial expression | Display | Visible wavelength camera | Emotional state |
| Head position | Display | Structured light or SLAM | Cognitive load (& vision thresholds) |
| Viewing distance | Display | Structured light or SLAM | Cognitive load (& vision thresholds) |
| Facial expression | Display | Structured light or SLAM | Emotional state |
| Valence | Display | Thermal camera | Emotional state |
| Arousal | Display | Thermal camera | Emotional state |
| EEG | Display | HMD sensors | Emotional state & Cognitive load |

TABLE 2-continued

| Physiological Monitoring Signal | Location | Sensor | Estimator |
|---|---|---|---|
| EOG gaze position | In-ear (e.g., smart earbud) | Earbud dipole electrode | Attentional locus |
| EEG | In-ear | Earbud dipole electrode | Emotional state & Cognitive load |
| Respiration | In-ear | Earbud microphone or accelerometer | Emotional state |
| Heart rate (Plethysmography) | In-ear | Earbud microphone, accelerometer, passive infra-red (PIR) | Emotional state |
| Heart-rate | Wrist (e.g., smartwatch) | PPG (photo sensor) | Emotional state |
| Galvanic skin response | Wrist | Skin conductance sensor | Emotional state-Arousal |

TABLE 3

| Physiological Monitoring Signal | Location | Sensor | Estimator |
|---|---|---|---|
| Facial expression group stats | Room | Visible camera | Emotional state |
| Facial expression group stats | Room | Thermal camera | Emotional state |
| CO2 | Room | Gas sensor | Emotional state |
| R3COH | Room | Gas sensor | Attentional locus |
| Respiration | Seat | Respiration sensor | Emotional state |
| Heart rate | Seat | Heart rate sensor | Emotional state |

There are many options on what kinds of E&N metadata may be inserted, as well as what kinds of signal modifications may be included in the E&N metadata. In some operational scenarios, some or all signal modifications used to converge assessed E&N states to expected E&N states are determined by the creatives, for example at a media content and metadata production stage (e.g., 202 of FIG. 2A or FIG. 2B, metadata in 2D, etc.). In some operational scenarios, some or all the signal modifications are determined using signal modification methods/algorithms (or models) that decide on what modifications should be made. These signal modification methods/algorithms (or models) may generate signal modification as appropriate for a specific type of E&N state and/or a specific magnitude (range) of any divergence between assessed and expected states for the specific type of E&N state.

10. Media Content Adjustments or Modification

FIG. 3A through FIG. 3G illustrate examples of emotional, cognitive, and attentional metadata and corresponding signal modifications in example operational scenarios. It should be noted that these are non-limiting examples. In some playback applications (e.g., educational media content, informative media content, etc.), narrative or cognitive state (e.g., as measured with cognitive load, as measured with attention locus, as measured with length of time a viewer is engaged, etc.) is critical or important to physiological monitoring and media content adjustments or modifications based on the physiological monitoring. In some playback applications (e.g., game media content, entertainment media content, etc.), emotional state (e.g., as measured through valence and arousal, as measured with facial expression, as measured with discrete classifications of emotion types, etc.) may be relatively important to physiological monitoring and media content adjustments or modifications based on the physiological monitoring. In some playback applications, both emotional and narrative states may be important to physiological monitoring and media content adjustments or modifications based on the physiological monitoring. In some playback applications, other combinations of emotional and narrative states may be important to physiological monitoring and media content adjustments or modifications based on the physiological monitoring.

Figure 3A:
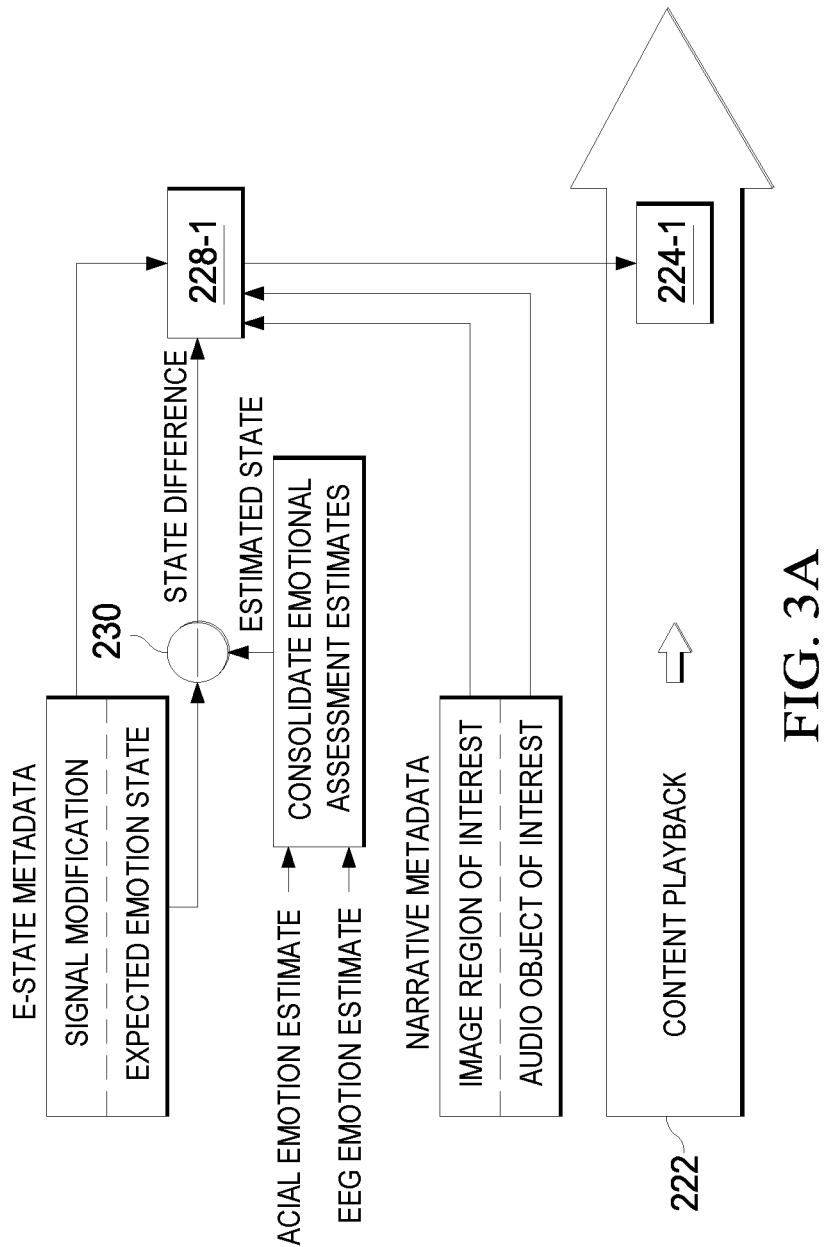

FIG. 3A illustrates example media rendering processing for emotional states and corresponding metadata by a playback device (e.g., 236 of FIG. 2C, etc.).

E&N metadata (e.g., 220 of FIG. 2A, etc.) in media metadata (e.g., 117-1 of FIG. 1A, etc.) is received by the playback device (236) with media content (e.g., 117-2 of FIG. 1A, etc.). In this example, the E&N metadata (220) comprises at least emotional expectations metadata or E-state metadata. The E-state metadata comprises an expected emotional state for a given time point (e.g., for a given scene, for a given time interval, etc.) along a content timeline implemented with content playback 222 of the media content (172-2) and signal modification options that can be applied by the playback device (236) when an assessed emotional state of a viewer as estimated or predicted for the given time point diverges from the expected state for the given time point as indicated in the E&N metadata (220).

Physiological monitoring signals may be generated (e.g., in real time, in near real time, within a strict latency budget, etc.) while the media content (172) is being adjusted and rendered to the viewer. By way of example but not limitation, one physiological monitoring signal may be generated using a camera with facial expression analysis software, while another physiological monitoring signal may be generated using EEG electrodes. These two physiological monitoring signals are processed to provide a facial emotion estimate and an EEG-based emotion estimate, which can be consolidated by a sensor fusion and segregation block (e.g., a device, a module, etc.) into a single emotional state estimate (denoted as "estimated state" in FIG. 3A). The emotional state estimate (or assessed emotional state) is compared with the expected state (which is specified in the metadata as part of the creative intent) from the E-state metadata to generate an emotional state difference. This difference is then fed into an emotional state content modification model 228-1 to generate or identify a signal modification 224-1 based on the emotional state difference, along with the possible signal modification options from the E-state metadata.

In some operational scenarios, the content modification model (228-1) is used to determine magnitude(s) or value(s) of specific operational parameter(s) of the signal modification (224-1), for example based on a magnitude of the state difference, etc. Other inputs to the content modification model (228-1) may include narrative metadata in the media metadata (117-1), such as the image region of interest (ROI) and the audio object of interest (AOI). From these inputs, the operational parameters of the signal modification (224-1) are determined and then used to modify a media content portion for the given time point to an actual media content portion to be played back (either through image or audio processing, or both) for the given time point.

Figure 3B:
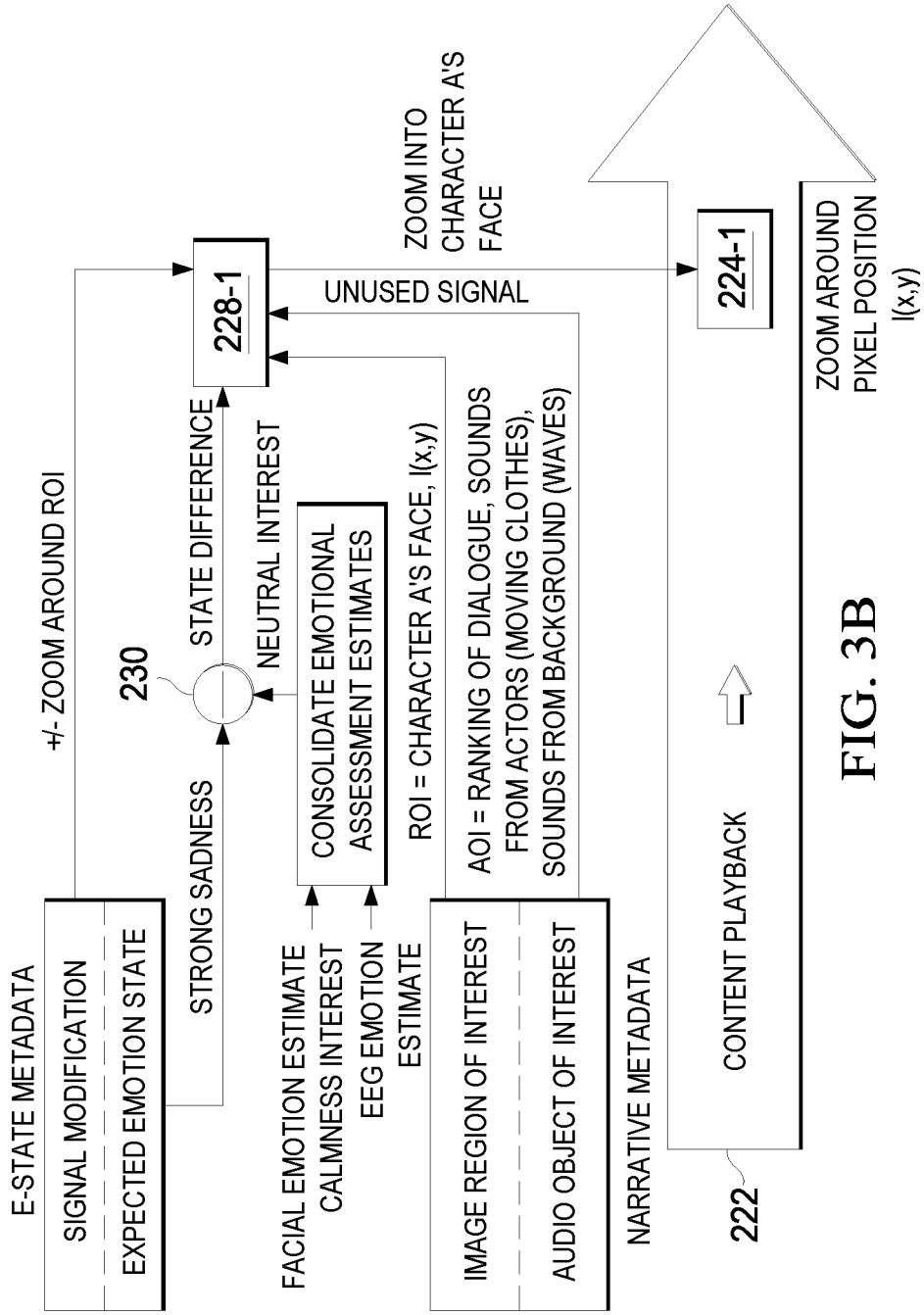

FIG. 3B illustrates a specific example of media rendering processing as shown in FIG. 3A. The media content (117-2) being adjusted and rendered by the playback device to the viewer may be a movie with a critical scene in which the central character may be saying one thing, but the character's facial expression belies a different emotion.

The viewer is listening audio for the scene with smart earbuds and watching the scene as being adjusted and rendered on a mobile display such as a tablet computer held at such a distance from the viewer that the viewer's field of view (FOV) is small. As a result, the character's subtle facial expressions cannot be seen due to perceptual resolution limits (e.g., the pixel Nyquist frequency exceeding the visual cutoff frequency, etc.).

The expected emotion state as specified in the E-state metadata indicates that the viewer's expected emotion is "strong sadness." The signal modification options as specified in the E-state metadata indicates zooming into or out of a specific region-of-interest (ROI) is the suggested signal modification option if the viewer's expected and assessed emotion states differ more than a magnitude threshold.

A display camera on the tablet computer may be used to acquire images of the viewer's face for facial expression analysis. Electrodes deployed with the smart earbuds may be located at different positions in contact with the viewer's head and used to acquire EEG signals from the viewer for EEG based emotion estimation.

In the present example, estimated emotional states from the physiological monitoring signals are conflicted. The display-camera-based facial expression estimate indicates that the viewer is in a "calm" emotional state, while the EEG-based emotion estimate indicates that the viewer is in an "interest" emotional state. The playback device as described herein consolidates these two emotional state estimates to output an overall signal gradation along a neutral-to-interest emotional vector that is smaller (e.g. in terms of arousal, valence, etc.) than the expected emotion state as intended by the creatives. The emotional state difference can then be derived and provided as input to the content modification model (228-1).

The narrative metadata has information on an image ROI, which is the pixel locations or image regions of the character's face, whereas the signal modification options for a specific emotional state difference as specified in the E-state metadata includes the image ROI. Additionally, optionally or alternatively, the narrative metadata may have information on relative rankings of audio objects of interest (AOIs), which is correlated with the image ROI. For the purpose of illustration only, the information on the relative rankings of audio objects may not be used.

The content modification model (228-1) for signal modification takes the magnitude of the emotional state difference, the ROI information in the narrative metadata, and/or the signal modification options of zooming into the ROI as specified in the E-state metadata, to determine that the viewer's (to-be-assessed) emotion state can be influenced or increased from the "neutral interest" to "strong sadness" according to the creative intent by zooming into the character's face. This information outputted from the content modification model (228-1) can then be used for carrying out the specific signal modification (224-1) in the content playback (222), for example by zooming into the pixel position (of the character's face) centered at I (x, y).

Figure 3C:
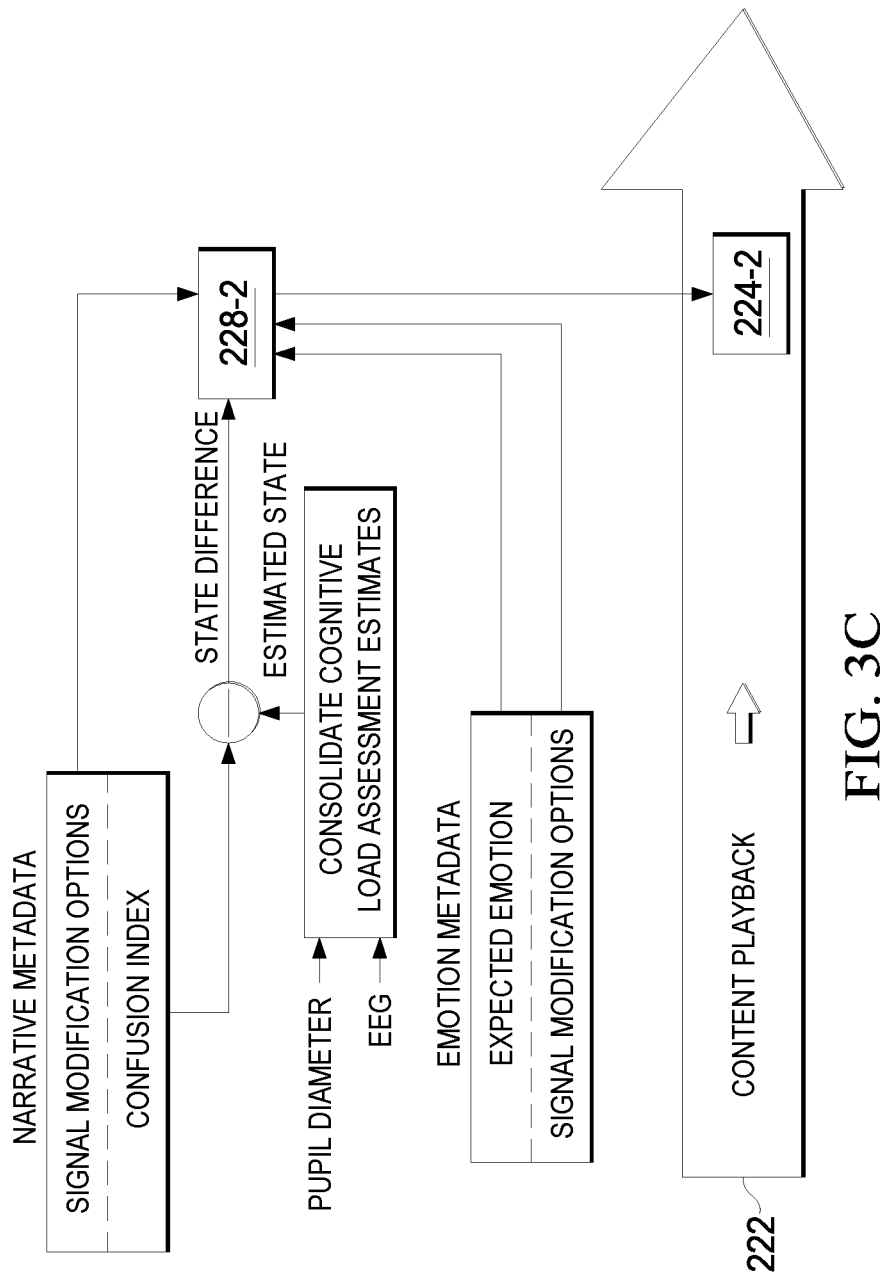

FIG. 3C illustrates example media rendering processing relating to cognitive states and corresponding metadata (or change therein) by a playback device (e.g., 236 of FIG. 2C, etc.).

E&N metadata (e.g., 220 of FIG. 2A, etc.) in media metadata (e.g., 117-1 of FIG. 1A, etc.) is received by the playback device (236) with media content (e.g., 117-2 of FIG. 1A, etc.). The E&N metadata (220) comprises narrative metadata (or N-state metadata) specifying an expected cognition state at least in part with a confusion index for a given time point (e.g., for a given scene, for a given time interval, etc.) along a content timeline implemented with content playback 222 of the media content (172-2) and signal modification options that can be applied by the playback device (236) when an assessed narrative state of a viewer as estimated or predicted for the given time point diverges from the expected narrative state as indicated in the E&N metadata (220) for the given time point.

In general, the narrative metadata may also include narrative ROIs and AOIs. However, in this example, for the purpose of illustration only, the ROIs and AOIs in the narrative metadata are not used for signal modification.

Physiological monitoring signals may be generated (e.g., in real time, in near real time, within a strict latency budget, etc.) while the media content (172) is being adjusted and rendered to the viewer. One physiological monitoring signal may be generated using a (e.g., hardware and/or software implemented, etc.) eye tracker in a display-sited camera (e.g., located on the same viewer-facing surface of the playback device or a tablet computer, etc.), while another physiological monitoring signal may be generated using EEG electrodes. These two physiological monitoring signals are processed by the playback device to provide or generate a pupil-diameter-based cognitive state estimate and an EEG-based cognitive state estimate. These two cognitive state estimates can be further consolidated by a sensor fusion and segregation block (e.g., a device, a module, etc.) into a single cognitive state estimate (denoted as "estimated state" in FIG. 3C). The estimated or assessed cognitive state is compared with the expected cognitive state (which is specified as the confusion index in the metadata as part of the creative intent) from the narrative metadata to generate a cognitive state difference. This difference can then be fed back into a cognitive (or narrative) state content modification model 228-2 to generate or identify a signal modification 224-2 based on the cognitive state difference, along with the possible signal modification options from the narrative metadata.

The content modification model (228-2) may be used by the playback device to determine magnitude(s) or value(s) of specific operational parameter(s) of the signal modification (224-2), for example based on a magnitude of the state difference, etc. Other inputs to the content modification model (228-2) may include emotional metadata in the media metadata (117-1). In some operational scenarios, the information in the emotional metadata may be deemed as secondary or minor contributors in the content modification model (228-2). From some or all of these inputs, the operational parameters of the signal modification (224-2) are determined and then used to modify a media content portion for the given time point to an actual media content portion to be played back (either through image or audio processing, or both) for the given time point.

Figure 3D:
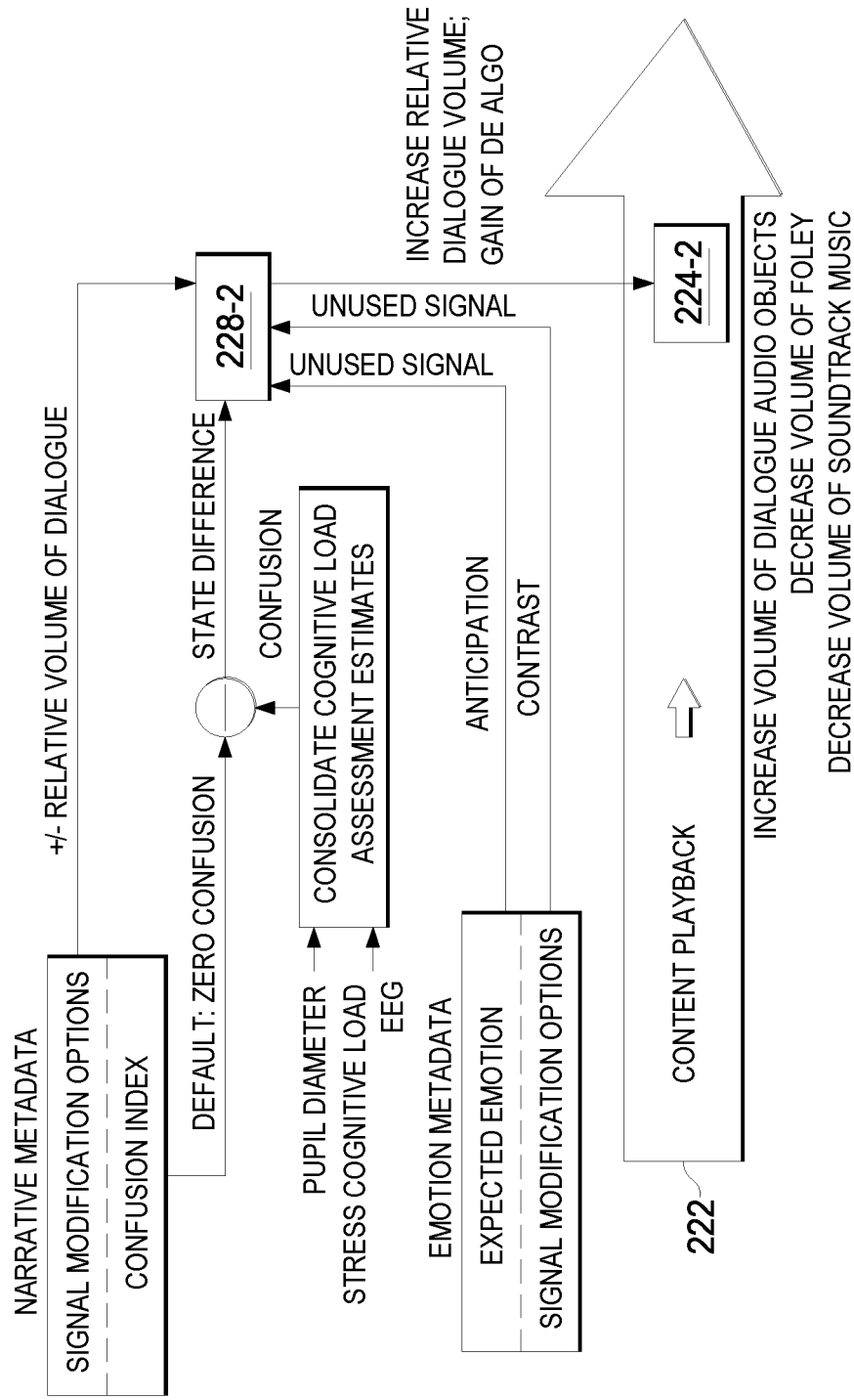

FIG. 3D illustrates a specific example of media rendering processing as shown in FIG. 3C. The media content (117-2) being adjusted and rendered to the viewer may be a movie with a scene in which a character explains something critical to the depicted story in a dialogue. However, the scene has a lot of auxiliary sounds. The viewer is watching on a tablet using smart earbuds, but the rendering environment is noisy enough that the earbuds do not sufficiently block the external sounds. Consequently, there are missing parts of the dialogue that are critical to the storyline.

The confusion index is set to zero in the media metadata (117-1) in the production stage (202) since the scene is an important dialogue scene of which the creatives desire the viewer to have a complete understanding.

The expected cognition state as specified in the narrative metadata indicates that the viewer's expected confusion index is set to zero by the creatives. The creatives intend or desire the viewer to have complete understanding of the scene or the dialog. It should be noted that in many cases the viewer's expected confusion index defaults to zero. However, there may be certain scenes in which the viewer's expected confusion index is set for a higher value than zero, such as in scenes that are meant to be overwhelming in complexity (e.g., action scenes, political drama of many arguing voices, etc.).

The signal modification options as specified in the narrative metadata further indicates that increasing the volume of the speaking voices is the suggested signal modification option, if the viewer's expected and assessed cognitive states differ more than a difference magnitude threshold, for example when the viewer's confusion index assessed through physiological monitoring is high relative to the pre-designated confusion index of zero.

A display camera on the tablet computer may be used to acquire images of the viewer's face for pupil diameter based cognitive load estimates. Electrodes deployed with the smart earbuds may be located at different positions in contact with the viewer's head and used to acquire EEG signals from the viewer for EEG based cognitive load estimation.

Estimated cognition loads from the physiological monitoring signals may be consolidated to output an overall cognitive load indicating that the viewer's confusion index is higher than the expected confusion index in the cognitive state as intended by the creatives. The cognitive state difference (e.g., a difference between expected and assessed confusion indexes, etc.) can then be derived and provided as input to the content modification model (228-2).

The content modification model (228-2) for signal modification takes the magnitude of the cognitive state difference as generated from physiological monitoring and/or the signal modification option(s) as specified in the narrative metadata, and generates or selects a signal modification option that indicates modulating an increase in dialogue volume relative to those of the other audio objects of the soundtrack for the purpose of reducing the viewer's assessed confusion index. The signal modification option outputted from the content modification model (228-2) is used for carrying out the specific signal modification (224-2) in the content playback (222) such as changing the ratio of volumes of dialogue audio objects over those of non-audio objects corresponding to Foley sounds and background music.

In the present example, there are emotion expectations metadata (or E-state metadata) with flags set to indicate an expected emotion of anticipation, and compensation steps (or signal modification options) of increasing image contrasts if a difference between the viewer's expected and assessed emotional states is greater than an emotional state difference threshold. However, the expected emotional state and the signal modification options as specified in the E-state metadata are not used in this example due to the fact that the physiological monitoring signals indicate the viewer may not be understanding the scene. Thus, the signal modification options for the emotional state divergence do not affect the resultant signal modification that is used to improve the viewer's cognitive state or increase the viewer's understanding of the scene.

Figure 1C:
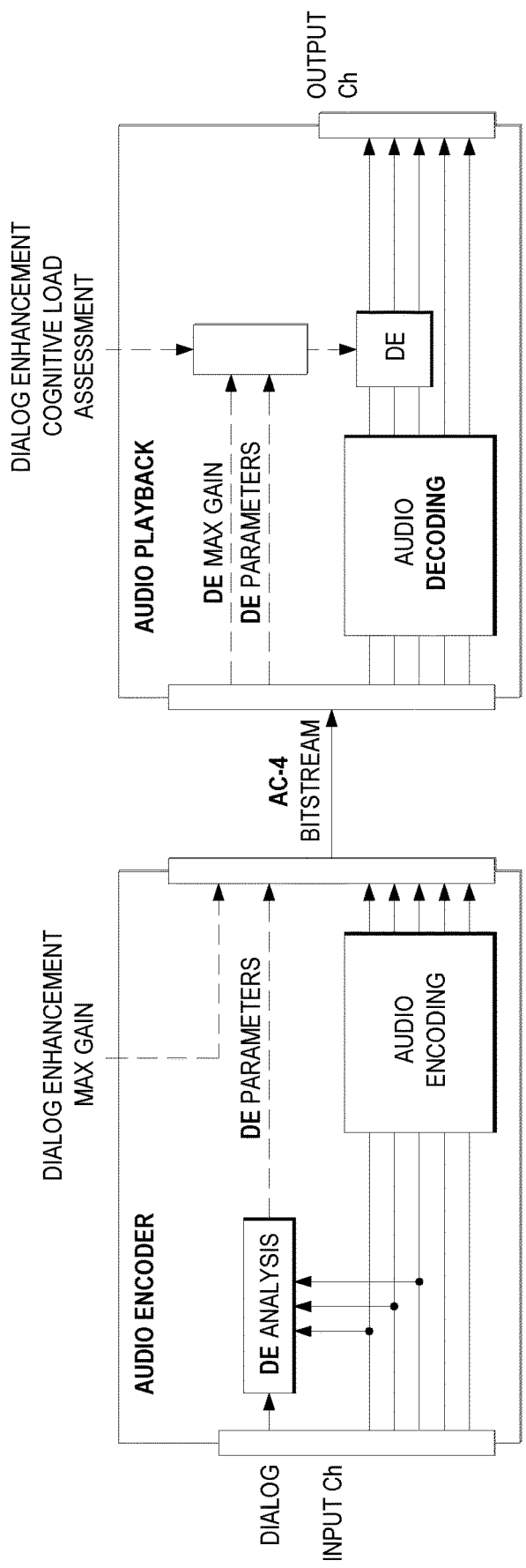
FIG. 1C illustrates example audio encoding and decoding, according to an embodiment.

FIG. 1C illustrates an example configuration for audio processing in which an audio encoder operates as a part of a media coding block (e.g., 120 of FIG. 1A, etc.) in a production stage (e.g., 202 of FIG. 2A, etc.) and an audio playback block operates as a part of a part of a media playback device comprising media decoding and rendering blocks (e.g., 130 and 135 of FIG. 1A, etc.).

The decoded media metadata (132-1) can be used together with the decoded media content (132-2) by the playback device, or audio and/or image rendering device(s) 135 operating in conjunction with the playback device, to perform physiological monitoring, physiological state assessment, media content adjustments or modifications, audio processing, video processing, audio reproduction/transduction, image rendering/reproduction, and so forth, in a manner that preserves, or minimizes or avoids distortions to, the creator's intent with which the release version has been generated.

As a part of the content playback (222), the playback device performs a metadata extraction operation 226 (e.g., as a part of a decoding/demultiplexing block 130 of FIG. 1A, etc.) to extract some or all of various metadata portions of the media metadata (117-1) bound with corresponding data portions of the media content (117-2) from the coded bitstream (122).

For a specific time point at which a data portion of the media content (117-2) is to be rendered to the viewer, an E&N difference calculator 230 of the playback device receives the viewer's assessed E&N state as estimated from the E&N state estimator (218). The E&N difference calculator (230) also receives an E&N metadata portion—in the media metadata (117-1) encoded with the coded bitstream (122)—corresponding to the data portion of the media content (117-2) and use the E&N metadata portion to determine the viewer's expected E&N state for the same time point.

The audio encoder comprises a dialog enhancement (DE) analysis block, an audio encoding block, etc. As illustrated in FIG. 1C, the audio encoder receives a plurality of input channels and a dialog input. Here, the dialog input represents pure dialog. Additionally, optionally or alternatively, some or all of the input channels comprise non-dialog audio contents (e.g., music, wind noises, sounds originated from non-human objects, background, ambient, etc.), mixed dialog or speech content elements in addition to the dialog input, etc.

The DE analysis block generates operational parameters (denoted as "DE parameters") for dialog enhancement using the dialog input and input channels that contain the mixed dialog/speech content elements. Example DE parameters may include, but are not necessarily limited to only, those generated or predicted using minimum mean square error (MMSE) optimization algorithms applied to the dialog input and the input channels that contain the mixed dialog/speech content elements. The dialog input, the plurality of input channels, DE parameters, configuration parameters (e.g., maximum level shift or gain for dialog enhancement, etc.), reconstruction parameters, etc., may be processed (e.g., downmixed, upmixed, spatialized, dynamic range controlled, etc.) and coded in the audio encoder into one or more coded channels of an audio bitstream (e.g., an AC-4 bitstream, etc.) in an overall coded bitstream.

In the consumption stage, the audio playback block receives the audio bitstream comprising the coded channels with dialog content, and decodes (by way of an audio decoding block) the received audio bitstream into the DE parameters, configuration parameters (e.g., maximum level shift or gain for dialog enhancement, etc.), reconstruction parameters, etc. In response to receiving a (realtime) signal modification (e.g., 224-2 of FIG. 3C or FIG. 3D, etc.) relating to cognitive load assessment (e.g., an assessed cognitive state or attention locus, etc.) generated from physiological monitoring (e.g., through gaze tracking, etc.) performed while media content in the coded bitstream is being adjusted and rendered to a viewer and a signal modification option for dialog enhancement (reverb reduction, etc.), the audio playback may carry out the signal modification (224-2) and generate (by way of a DE block) one or more output audio channels with enhanced dialog (e.g., increased dialog volume or raised dialog normalization, reduced reverb, relatively accurate positions of audio objects representing dialog content, increased signal-to-noise ratio, etc.).

FIG. 3E illustrates example media rendering processing relating to narrative states as assessed with attention loci (or viewer attention) and corresponding metadata (or change therein) by a playback device (e.g., 236 of FIG. 2C, etc.).

In this particular example, E&N metadata (e.g., 220 of FIG. 2A, etc.) in media metadata (e.g., 117-1 of FIG. 1A, etc.) is received by the playback device (236) with media content (e.g., 117-2 of FIG. 1A, etc.). The E&N metadata (220) comprises narrative metadata (or N-state metadata) but no emotion expectations metadata (or E-state metadata), as specified by the creatives. The narrative metadata comprises an expected narrative state represented by one or more expected attention loci of specific image ROIs and AOIs to which the viewer's attention is monitored/assessed for a given time point (e.g., for a given scene, for a given time interval, etc.) along a content timeline implemented with content playback 222 of the media content (172-2) and signal modification options that can be applied by the playback device (236) when an assessed state (e.g., estimated state, predicted state, etc.) of a viewer as estimated or predicted for the given time point diverges from the expected state for the given time point.

Physiological monitoring signals may be generated (e.g., in real time, in near real time, within a strict latency budget, etc.) while the media content (172) is being adjusted and rendered to the viewer. For the purpose of illustration, the physiological monitoring signals include two physiological monitoring signals coming from different sensors describing the viewer's gaze position, as mapped to (locations or image regions in) the content image. The two gaze positions respectively generated by the two gaze position physiological monitoring signals are consolidated by a sensor fusion and segregation block (e.g., a device, a module, etc.) into a single (assessed) gaze position, which is then compared with the intended or expected image ROI from the narrative metadata. Assume that for some reason the viewer is visually fixating a non-essential portion of rendered images in the scene, and thus the consolidated assessed gaze position results in a difference when compared to the expected gaze position corresponding to the specific ROI as indicated in the narrative metadata. This difference can be provided as input to a narrative state (or attention locus) content modification model 228-2 to generate or identify a selected signal modification 224-3 based on the emotional state difference, along with the possible signal modification options from the narrative metadata. The difference is used to control the selected signal modification (224-3) which is intended to shift the viewer's gaze back toward the ROI.

In some operational scenarios, the content modification model (228-2) is used to determine magnitude(s) or value(s) of specific operational parameter(s) of the selected signal modification (224-3) based at least in part on a magnitude of the state difference or gaze position difference. The operational parameters of the selected signal modification (224-3) can be used to modify a media content portion for the given time point to an actual media content portion to be played back (either through image or audio processing, or both) for the given time point.

Figure 3F:
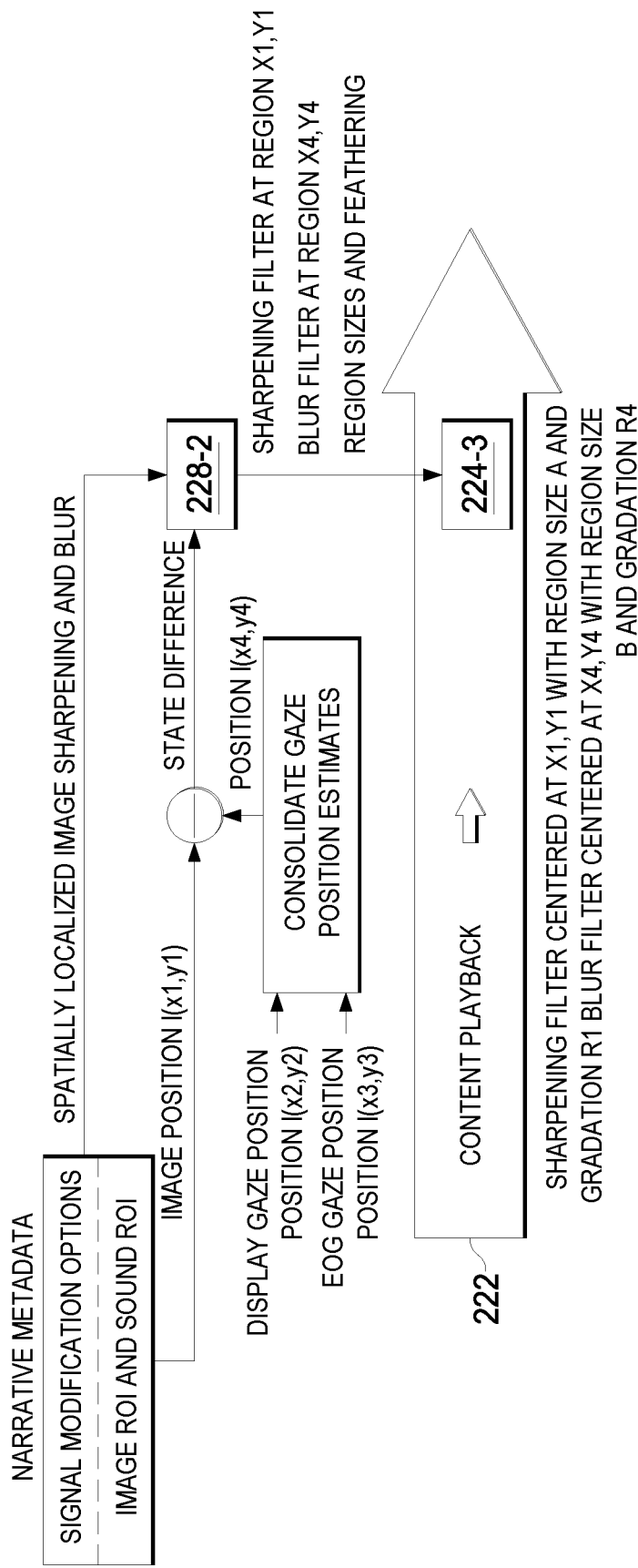

FIG. 3F illustrates a specific example of media rendering processing as shown in FIG. 3E. The narrative metadata for compensation of the gaze position and ROI mismatch is to apply a localized sharpening filter centered at the ROI.

An eye tracker with a display-based camera on the playback device (236) may be used to provide gaze position estimates (denoted as position l(x2, y2)) with respect to the viewer. An EOG module operating with eyeglasses, smart earbuds, etc., may be used to acquire EOG signals from the viewer for gaze position estimates (denoted as position l(x3, y3)) with respect to the viewer.

Estimated gaze positions from the physiological monitoring signals may be consolidated to output an overall gaze position (or assessed attention locus; denoted as position l(x4, y4)) and compared with the expected gaze position (or expected attention locus; (denoted as position l(x1, y1))) specified by the narrative state in the narrative metadata as intended by the creatives. The attention locus difference (e.g., a difference between expected and assessed gaze positions, etc.) can then be derived and provided as input to the content modification model (228-2).

The content modification model (228-2) for signal modification takes the magnitude of the attention locus (or narrative state) difference as generated from physiological monitoring and/or the signal modification option(s) as specified in the narrative metadata, and generates or selects a signal modification option that indicates controlling the strength, the spread, and/or the feathering (gradation) of a localized sharpening filter for the purpose of shifting the viewer's assessed attention locus to the ROI specified in the narrative metadata. The selected signal modification option outputted from the content modification model (228-2) can then be used for carrying out a specific signal modification (224-3) in the content playback (222). For example, a sharpening filter may be applied at the expected attention locus at the position l(x1, y1), whereas a blur filter may be applied at the assessed attention locus at the position l(x4, y4). Region sizes and/or feathering of the sharpening and blur filters may be controlled at least in part on the magnitude of the attention locus difference determined through the physiological monitoring and the E&N metadata. For example, a user's eye tends to be drawn or steered to relatively sharp spatial regions of the image.

Figure 3G:
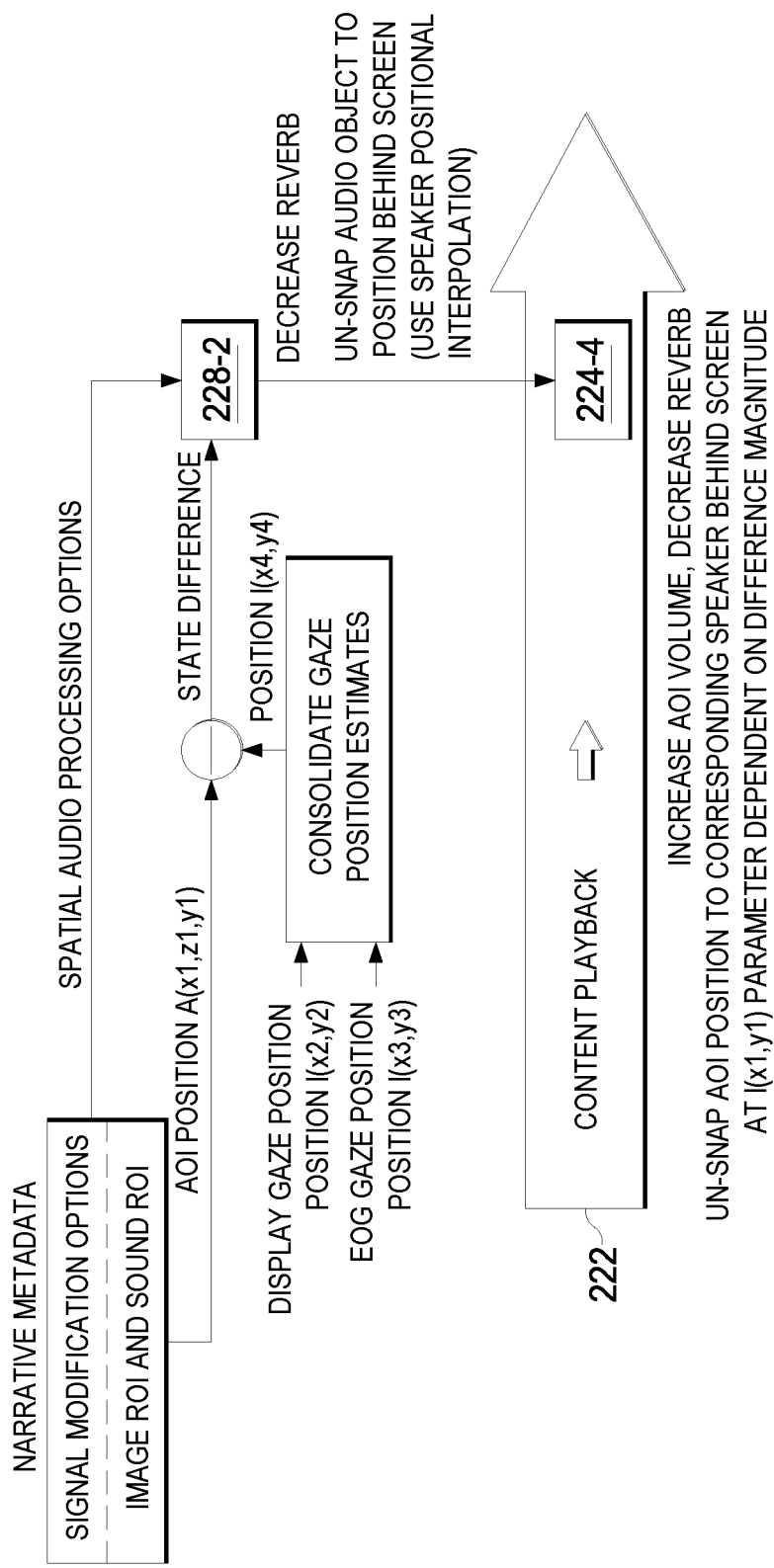

FIG. 3G illustrates another specific example of media rendering processing as shown in FIG. 3E. In this example, the viewer is watching in a home theater with a full immersive sound system (e.g., ATMOS sound system, etc.) and a large high-end image display (e.g., 105 inch image display, etc.) that uses standing glass vibration to reproduce or emanate sounds from received audio data in the media content (117-2) directly from the screen of the image display with a 3×3 positional grid resolution (e.g., Crystal Sound technology, etc.).

In many operational scenarios, a low tolerance snap option is adopted in immersive audio processing. The term "snap" means to snap an audio object position to (or to emit sounds of an audio object from) the nearest positioned speaker. Under this low tolerance snap option, the use of single speaker—as opposed to use of multiple speakers with panning or interpolation—is favored (or is likely to be selected) in the immersive audio processing. The use of single speaker better preserves timbre aspects or quality of sounds but sacrifices positional accuracy of an audio object to be depicted as emitting the sounds.

In the present example, the media content (117-2) being rendered to the viewer is a movie with a candlelit scene in which Newton (or the character) is experimenting with alchemy, more specifically exploring vegetation of metal. The candlelit scene in a cathedral late at night depicts a complex crystalline silver texture sprawled across the marble floor all in motion with accompanying metallic crinkling sounds. One portion of the complex crystalline silver texture is changing shape from crystalline to biomorphic dendritic shapes, while corresponding sounds—represented by or depicted as emitting from an audio object of interest—from that activity is changing to more of fluidic pitch-bending having subtle human voice undertones (implying the "vital spirit" Newton was seeking). More specifically, these sounds are localized to the image region depicting the anomalous region of the dendritic growth in the above-mentioned portion of the complex crystalline silver texture.

In the large-display rendering environment, before the camera slowly zooms into the anomalous region to eventually show a convex reflection of Newton's entranced face, the anomalous region depicted in the image region only occupies a small part of images rendered on the large image display (or screen) and thus can easily be overlooked. As the image display is relatively large, even though the viewer is looking in the general neighborhood of the dendritic growth region, the viewer's gaze position is still slightly off so the anomalous region (or the expected attention locus) falls just outside the viewer's perifovea. Because the viewer's visual resolution to visual objects outside the viewer's perifovea is less acute, the distinction between the crystalline and more biomorphic textures cannot be distinguished in the viewer's vision.

The same physiological monitoring signals and the same ROI and AOI metadata in the narrative state portion of the E&N metadata (or data fields therein) used in FIG. 3F can be used in the present example as illustrated in FIG. 3G. However, in this present example, the creatives have decided and specified in the E&N metadata that a signal modification option used to redirect the viewer's assessed attention locus is through audio processing.

As previously noted, the deviation or divergence between the viewer's assessed attention locus and the viewer's expected attention locus can be detected through physiological monitoring while the media content (117-2) is being adjusted and rendered to the viewer in this large-display rendering environment.

In response to determining that the viewer's assessed attention locus deviates (e.g., outside the viewer's perifovea, etc.) from the expected attention locus indicated with the ROI and/or AOI by the creatives, the viewer's attention locus can be guided through audio processing to the expected attention locus or the anomalous region where the mysterious growing dendritic region looks alive.

In some operational scenarios, a metadata specification (e.g., SMPTE ST 2098, etc.) can be used to set forth or specify data fields of the media metadata (117-1). One of the data fields of the media metadata (117-1) can be used to describe or indicate whether timbre or audio object position is relatively important in immersive audio rendering.

In the present example, according to the creative intent, precisely positioning the AOI is more important than preserving the timber of sounds of the AOI if the ROI or AOI falls out of the viewer's perifovea. The creative intent may indicate a high tolerance snap option—as opposed to the low tolerance snap option favored in other immersive audio processing scenarios—in the above-mentioned data field of the media metadata (117-1).

Given the high tolerance snap option specified in the narrative metadata of the media metadata (117-1) as the signal modification option when the viewer's assessed attention locus deviates from the viewer's expected attention locus, the use of the high tolerance snap option (or setting) causes the sounds to be rendered with accurate positions of the audio object (the anomalous region) by the nine (or 3×3) speaker elements, as opposed to being placed into one of the nine positions on the screen (corresponding to the nine speaker element positions in the 3×3 sound grid of the glass panel speaker). The high tolerance snap option avoids or prevents discretization into a single speaker element at a single position that would likely cause the audio object position (or the position of the AOI) in the audio rendering to be mismatched from the relatively small image region depicting the anomalous region on the screen that is supposed to emit the same sounds.

In the present example, the snap option to accurately place the audio object position and tolerate timber quality deterioration has been set or selected by the creatives as the signal modification option in the rankings of various possible signal modification options. However, it should be noted that, in many other operational scenarios (e.g., music instrument in a multi-player scene, etc.) other than the present example, audio processing may favor using single speaker for the purpose of preventing timber distortion at the expense of more exactly placing sounds at exact screen positions.

Additionally, optionally or alternatively, since reverb (or reverberation) also causes sound position diffusion, the creatives may specify an intent that reverb in the present example is decreased from its default setting as the reverb would be relatively high due to the cathedral setting in the depicted scene.

An audio space representation used to indicate positions of an audio object may be denoted as $A(x, y, z)$. Likewise, an image space representation used to indicate positions of a depicted visual object may be denoted as $I(x, y, z)$. In a non-limiting example, positions in the audio space representation may be converted into corresponding positions in the image space representation as follows: I(x, y, z)=A(x, z, y). That is, the z dimension/axis (indicating depth) in the image space representation corresponds to the y dimension/axis in the audio space representation, whereas the y dimension/axis (indicating height) in the image space representation corresponds to the z dimension or axis in the audio space representation, such as in some operational scenarios in which SMPTE 2098 is used to specify metadata coding syntax in a coded bit stream as described herein.

Expected positions (denoted as A(x1,z1,y1)) of the audio object in the audio space representation as specified in the narrative metadata may be converted to corresponding expected positions (denoted as I(x1,y1,z1)) of the image space representation. The expected positions of the audio object as converted into the image space representation represent the viewer's expected attention locus, and are compared with the viewer's assessed attention locus represented by consolidated gaze position estimates (denoted as I(x4,y4)) generated from display gaze positions (denoted as I(x2,y2)) and EOG gaze positions (denoted as I(x3,y3)) in the image space representation.

A difference (as determined with the x and y dimensions of the positions) between the viewer's expected attention locus and the viewer's assessed attention locus can be used as input by the content modification model (228-2) for signal modification to generate a signal modification option that indicates decreasing reverb and un-snapping the audio object of interest to a speaker position behind screen—a speaker to which the now un-snapped AOI is snapped may be determined or selected using speaker positional interpolation—for the purpose of shifting the viewer's assessed attention locus to the AOI or the corresponding ROI (e.g., the anomalous region, etc.) specified in the narrative metadata. The signal modification option outputted from the content modification model (228-2) can then be used for carrying out a specific signal modification (224-4) in the content playback (222). For example, the specific signal modification may cause media rendering processing to increase the volume of the AOI, decrease the reverb of the AOI, un-snap the AOI's position to a selected speaker behind the screen at I(x1,y1), snap sounds of the AOI to the selected speaker. Operational parameters used to increase the volume, reduce the reverb, a positional tolerance used in selecting the speaker, etc., may be set dependent on a magnitude of the difference between the viewer's expected attention locus and the viewer's assessed attention locus.

This large-display rendering environment may be contrasted with a small-display rendering environment in which a viewer views the same scene on a small image display (or screen). In the small display environment (e.g., as indicated by environment characterization data configured for the playback device (236), etc.), most of the rendered images for the scene are likely to fall within the viewer's perifovea (with relatively acute or sharp vision) anyway. The dendritic shapes in the anomalous region (which looks alive) would likely be noticed by the viewer without having to resort to the advanced audio compensation processing to be applied in the large-display rendering environment.

As mentioned, many other examples can be devised with similar media rendering processing, but with different specific emotions described by the media metadata (117-1) as well as signal modification options specified therein.

11. Example Content Adjustment Processes

Figure 2H:
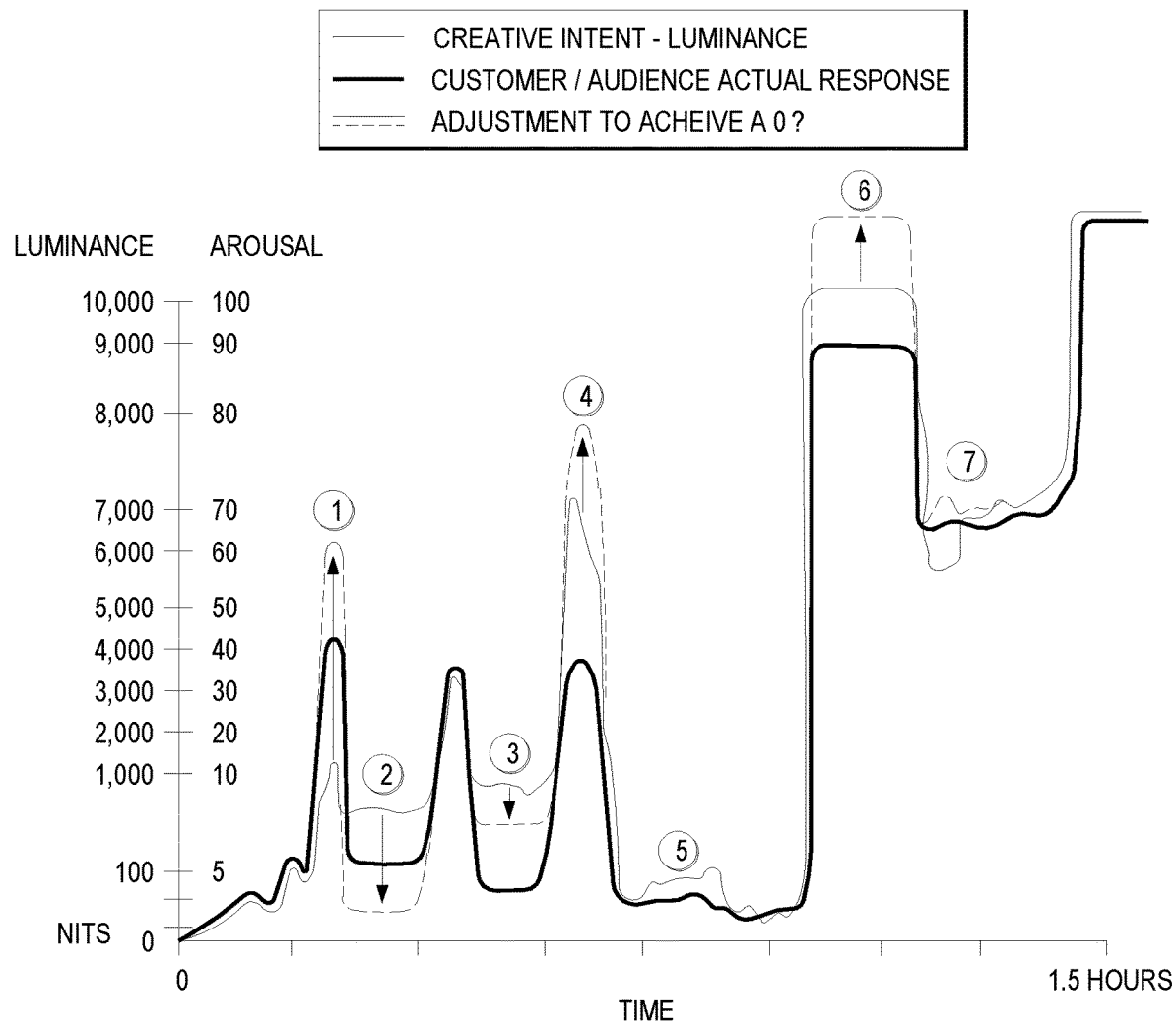
FIG. 2H illustrates example media characteristics of media content and media content adjustments/modifications to the media content.

FIG. 2H illustrates example plots representing (i) media characteristics (e.g., luminance, etc.) of media content (e.g., 117-2 of FIG. 1A, etc.) generated in a production stage (e.g., 202 of FIG. 2A, etc.) based on expected emotional and/or narrative states as specified by the creatives of the media content (117-2), (ii) a viewer's assessed states generated in a consumption stage (e.g., 204 of FIG. 2A, etc.) through physiological monitoring, and (iii) media content adjustments or modifications (e.g., luminance differences, etc.) to be made in the consumption stage (204) by a playback device on the media characteristics (e.g., luminance, etc.) of the media content (117-2) to achieve, or attempt to achieve, a zero divergence (denoted as "OA") between the viewer's expected and assessed states. Processes used to generate media content and metadata, to perform physiological monitoring, and to make media content adjustments/modifications, can be performed by one or more computing devices comprising a playback device and one or more physiological monitoring devices/components operating in conjunction with the playback device.

Based at least in part on (i) the viewer's expected emotional and/or narrative states indicated with E&N metadata (e.g., in media metadata 117-1 of FIG. 1A, etc.) that reflects or represents the creative input, (ii) the viewer's assessed states as determined/estimated/predicted from available physiological monitoring signals, and (iii) signal modification options indicated with E&N metadata, the media content adjustments/modifications may be selected from a wide variety of media content adjustments/modifications used to alter original visual and/or audio (acoustic) characteristics of the media content (117-2) as received in a coded bitstream (e.g., 122 of FIG. 1A, etc.) to modified visual and/or audio (acoustic) characteristics of rendered media content to the viewer.

Example visual characteristics to be adjusted/modified as described herein include, but are not necessarily limited to only, any of: (e.g., min, max, average, highlight, mid-tone, dark region, etc.) luminance, luminance dynamic range, color, saturation, hue, spatial resolution, image refresh rate, zoom-in or -out operations, image steering (images are steered to follow a viewer's movements from room to room), and so forth. Any, some or all of these visual characteristics may be measured in relation to a sequence of rendered images, a visual scene (bounded by two consecutive scene cuts), a subdivision of a visual scene, a group of pictures (GOP), one or more tile sized regions spanning multiple frames, chunks of the spatiotemporal stream, an entire image (e.g., average picture level or APL, etc.), related to an image region in one or more image regions (of a rendered/represented image) that depicts a specific character or object, and so forth.

Example audio characteristics to be adjusted/modified as described herein include, but are not necessarily limited to only, any of: audio object positions (or spatial positions of audio sources depicted in an audio soundfield represented or rendered in a rendering environment), sizes/radii (e.g., point audio sources, audio sources with a finite size, diffusive audio sources such as winds, ambient sounds, etc.) of audio objects, directions and/or trajectories of audio objects, dialog and/or non-dialog volume, dialog enhancement, audio dynamic range, specific loudspeaker selection, specific loudspeaker configuration, spectral equalization, timber, reverb, echo, spectral/frequency dependent processing, phases and/or delays, audio attack or release times, and so forth. Any of these audio characteristics may be measured in relation to a sequence of audio frames/blocks, an audio scene, a subdivision of an audio scene, a soundtrack, a single audio object, a cluster of audio objects, a sound element, an entire soundfield, related to a soundfield region in one or more soundfield regions (of a rendered/represented soundfield), an audio or acoustic object of interest that depicts a specific character or object, and so forth.

The media content adjustments/modifications (or signal modifications) selected at runtime by the playback device may act on (or alter) one or more visual characteristics of the media content (117-2). Additionally, optionally or alternatively, the media content adjustments/modifications (or signal modifications) selected by the playback device may act on (or alter) one or more audio characteristics of the media content (117-2). Additionally, optionally or alternatively, the media content adjustments/modifications (or signal modifications) selected by the playback device may act on (or alter) a combination of one or more visual and/or audio characteristics of the media content (117-2). It should be further noted that in various embodiments, different signal modifications may be used at different time points (e.g., different scenes, etc.) of content playback (e.g., a movie, a TV program, etc.) in a media consumption session.

For the purpose of illustration only, media content (e.g., 117-2 of FIG. 1A, etc.) has a playback time duration of one and half hours along a content timeline (e.g., 210 of FIG. 2A, etc.). During this playback time duration, the creatives of the media content (117-2) expect or intend a viewer to experience one or more specific expected emotional and/or narrative states that vary as function(s) of time. The creatives' intent (or creative intent) including but not limited to the one or more specific expected emotional and/or narrative states may be used to generate the media content (117-2) and media metadata (e.g., 117-1 of FIG. 1A, etc.) corresponding to the media content (117-2).

An emotional and/or narrative state as described herein may be semantically or non-semantically represented in the media metadata (117-1) and/or media content (117-2). As used herein, the term "semantically" may mean describing the emotional and/or narrative state in a semantic expression using symbols, tokens, terminologies or terms of art in neuroscience, cinema art, audio art, or related fields. In many operational scenarios, while the creatives may use a semantic expression (e.g., "audience should understand this key story detail," "help audience to understand this if attention locus is not at this character," etc.) to describe or define an expected emotional and/or narrative state, the creatives' description of such expected state may be (e.g., programmatically, fully automatically, with no or minimal user interaction once the semantic expression is given, with further user interaction to define one or more ranges, thresholds, in whole, in part, etc.) translated or converted into a non-semantic representation (e.g., as defined in an engineering process, in a media production block 115 of FIG. 1A, etc.) that is closely associated with underlying visual and/or audio characteristics of rendered images (e.g., visual scenes, subdivision of visual scenes, individual images, portions or regions of an image, etc.) and/or rendered audio (e.g., rendered acoustics, rendered audio soundfield, rendered audio objects, audio scenes, subdivision of audio scenes, individual audio frames, individual audio objects, etc.).

By way of illustration but not limitation, in the production stage (202), the viewer's expected state(s)—such as expected arousal, which represents an expected emotional state or a dimension of expected measurable emotion state(s)—while consuming the media content (117-2) over time are translated/converted into, or implemented in the media content (117-2) with, original or pre-adjusted average picture levels (or APLs) as a function of time, which is illustrated as a thick solid curve in FIG. 2H.

In some operational scenarios, the translation, conversion and implementation of the semantically described viewer's expected state(s) over time into modifiable visual and/or audio characteristic(s) such as the non-semantically described APLs over content time (in a release version outputted from the production stage (202)) may be based in part on one or more E&N-state-to-media-characteristic translation/conversion/implementation models (e.g., algorithms, methods, procedures, operations, etc.). The translation/conversion/implementation may be, but are not necessarily limited to only, one or more theoretical and/or empirical models for using specifically selected visual and/or audio characteristics to influence the viewer's specific emotional and/or narrative states. These models may (e.g., programmatically, fully automatically, with no or minimal user interaction once the semantic expression is given, with further user interaction to define one or more ranges, thresholds, in whole, in part, etc.) incorporate, or vary output with, additional input such as max, min, average luminance, other visual characteristics, non-visual characteristics, etc.

Some or all of these translation/conversion/implementation models used to translate, convert and/or implement a semantically described emotional and/or narrative state to (low level) non-semantic visual and/or audio characteristics may be implemented based on responses (e.g., collected with a population of different media content types or a subset of one or more specific media content types, etc.) of an average viewer (e.g., as represented by the human visual system or HVS, etc.) and/or an average listener (e.g., with average hearing and acoustic comprehension, etc.). Additionally, optionally or alternatively, some or all of these translation/conversion/implementation models used to translate, convert and/or implement a semantically described emotional and/or narrative state to (low level) non-semantic visual and/or audio characteristics may be implemented based on responses of viewers representing various subset demographics (e.g., horror fans, equestrian enthusiasts, etc.).

In response to receiving the media content (117-2) and the media metadata (117-1), the playback device can render the media content (117-2) to a viewer; use available physiological monitoring devices/sensors/processors operating with the playback device in a rendering environment to monitor the viewer's emotional and/or narrative responses (or to generate physiological monitoring signals) as functions of time while the viewer is consuming (viewing and listening to) visual and/or audio content rendered with the media content (117-2); use the viewer's emotional and/or narrative responses (or physiological monitoring signals) to generate the viewer's specific assessed emotional and/or narrative states such as assessed arousal as a function of time; etc. The viewer's specific assessed emotional and/or narrative states may be of the same kind(s) as the viewer's specific expected emotional and/or narrative states such as arousal. By way of example but not limitation, the viewer's specific assessed emotional and/or narrative states such as arousal over time may be represented as percentile values over time in a thin solid curve of FIG. 2H.

As the viewer likely deviates from the average viewer/listener used in the translation/conversion/implementation models to translate or map the viewer's expected state(s), and also as the rendering environment in which the playback device operates likely deviates from a reference rendering environment at which the media content (117-2) is targeted, the viewer's assessed state(s) (or the thin solid line of FIG. 2H) likely deviate or differ from the viewer's expected state(s) (or the thick solid line of FIG. 2H), for example expected arousal represented with expected percentile values (not shown) as specified in the media metadata (117-1).

For example, at a first time point (corresponding to the circle with numeral 1 in FIG. 2H) of the content timeline (210), in response to determining that the viewer's assessed state(s) such as assessed arousal as estimated or predicted by physiological monitoring (as indicated in the thin solid line of FIG. 2H) is under-responsive as compare with the viewer's expected state(s) such as assessed arousal (not shown) as indicated in the media metadata (117-1) for the first time point, the playback device can apply a first media content adjustment/modification (or a first signal modification) as represented by a difference between the dotted and thick solid lines of FIG. 2H at the first time point to change or raise a first original or pre-adjusted APL at the first time point as implemented in the received media content (117-2) to a first adjusted or modified API at the first time point in rendered media content derived from the received media content (117-2). The first adjusted or modified API as raised from the original or pre-adjusted APL may be used to cause the viewer's assessed state(s) or arousal to move toward the viewer's expected state(s) or arousal (toward achieving a zero difference or OA), or to become more aroused.

The first media content adjustment/modification, or the raising of the APL as represented by the difference between the dotted and thick solid lines of FIG. 2H, may be generated through adjusting luminance tone mapping (e.g., adjusting max, min and average luminance values, adjusting pivots, slopes, offsets in luminance value distribution/mapping, etc.) based on negative feedback in the closed-loop system implemented in the playback device with its magnitude proportional to or scale with a magnitude of the difference between the viewer's expected and assessed state(s). Additionally, optionally or alternatively, the first media content adjustment/modification may be generated based at least in part on model(s) similar to those used in translating, converting and/or implementing the viewer's specific expected emotional and/or narrative states in the media content (117-2) in the production stage (202).

At a second time point (corresponding to the circle with numeral 2 in FIG. 2H) of the content timeline (210), in response to determining that the viewer's assessed state(s) such as assessed arousal as estimated or predicted by physiological monitoring (as indicated in the thin solid line of FIG. 2H) is over-responsive as compare with the viewer's expected state(s) such as assessed arousal (not shown) as indicated in the media metadata (117-1) for the second time point, the playback device can apply a second media content adjustment/modification (or a second signal modification) as represented by a difference between the dotted and thick solid lines of FIG. 2H at the second time point to change or lower a second original or pre-adjusted APL at the second time point as implemented in the received media content (117-2) to a second adjusted or modified APL at the second time point in rendered media content derived from the received media content (117-2). The second adjusted or modified APL as lowered from the original or pre-adjusted APL may be used to cause the viewer's assessed state(s) or arousal to move toward the viewer's expected state(s) or arousal (toward achieving a zero difference or OA), or to become less aroused.

The second media content adjustment/modification, or the lowering of the APL as represented by the difference between the dotted and thick solid lines of FIG. 2H, may be generated based on negative feedback in the closed-loop system implemented in the playback device with its magnitude proportional to or scale with a magnitude of the difference between the viewer's expected and assessed state(s). Additionally, optionally or alternatively, the second media content adjustment/modification may be generated based at least in part on model(s) similar to those used in translating, converting and/or implementing the viewer's specific expected emotional and/or narrative states in the media content (117-2) in the production stage (202).

For a third time point (corresponding to the circle with numeral 3 in FIG. 2H) of the content timeline (210), media rendering operations performed by the playback device based on physiological monitoring, the received media content (117-2) and/or the received media metadata (117-1) are similar to those performed for the second time point.

For a fourth time point (corresponding to the circle with numeral 4 in FIG. 2H) of the content timeline (210), media rendering operations performed by the playback device based on physiological monitoring, the received media content (117-2) and/or the received media metadata (117-1) are similar to those performed for the first time point.

For a fifth time point (corresponding to the circle with numeral 5 in FIG. 2H) of the content timeline (210), media rendering operations performed by the playback device based on physiological monitoring, the received media content (117-2) and/or the received media metadata (117-1) are similar to those performed for the second or third time point, but to a less extent as the difference between the viewer's expected and assessed state(s) is smaller than those associated with the second or third time point. In some operational scenarios, no adjustment is made for the fifth time point when the difference between the viewer's expected and assessed state(s) is smaller than an E&N state difference threshold (e.g., preconfigured, dynamically configured, adaptively set, etc.).

For a sixth time point (corresponding to the circle with numeral 6 in FIG. 2H) of the content timeline (210), media rendering operations performed by the playback device based on physiological monitoring, the received media content (117-2) and/or the received media metadata (117-1) are similar to those performed for the first or fourth time point, but to a less extent as the difference between the viewer's expected and assessed state(s) is smaller than those associated with the first or fourth time point. In some operational scenarios, no adjustment is made for the fifth time point when the difference between the viewer's expected and assessed state(s) is smaller than an E&N state difference threshold (e.g., preconfigured, dynamically configured, adaptively set, etc.).

For a seventh time point (corresponding to the circle with numeral 7 in FIG. 2H) of the content timeline (210), no adjustment is made by the playback device in response to determining that the difference between the viewer's expected and assessed state(s) is smaller than an E&N state difference threshold (e.g., preconfigured, dynamically configured, adaptively set, etc.).

As shown in FIG. 2H, the viewer's expected emotional and/or narrative state(s) as indicated, specified and/or implemented in media content and metadata based on the creative intent can vary with time in the content timeline (210) or content playback implemented by the playback device. At some time points or time intervals (or some scenes), the viewer may be expected to be more excited, whereas at some other time points or time intervals (or some other scenes), the viewer may be expected to be less excited, even subdued or quiet, for example in order to warm up or prepare for a massive shock or an elevation of interest or emotional arousal. Similarly, at some time points or time intervals (or some scenes), the viewer may be expected to be more engaged, whereas at some other time points or time intervals (or some other scenes), the viewer may be expected to be less engaged, even relaxed.

The viewer's expected state(s) as indicated, specified and/or implemented in media content and metadata based on the creative intent provide a programmed (or programmable in the production stage (202)) baseline around which the closed-loop system implemented by the playback device can aim or attempt to achieve a zero divergence. More specifically, as previously noted, the viewer's assessed state(s) corresponding to the viewer's expected states can be obtained by receiving and processing the (e.g., real time, near real time, etc.) physiological monitoring signals generated by available physiological devices/sensors operating in the rendering environment with the playback device. Thus, the viewer's assessed state(s) such as assessed arousal can be generated by way of the available physiological devices/sensors such as EEG electrodes, GSR sensors, etc., and compared with the viewer's expected state(s). Differences between the viewer's assessed and expected state(s) such as assessed and expected arousals can be used as negative feedback by the closed-loop system implemented by the playback device in the content playback to attempt to achieve a zero divergence between the viewer's assessed and expected state(s), subject to a state difference threshold in some operational scenarios.

It should be noted that the viewer's assessed or expected state(s) are not limited to only the assessed or expected physiological responses of the viewer such as arousal as measured by a specific type of physiological monitoring device/sensor/tool. The viewer's assessed or expected state(s) can be specified, conveyed, and/or measured by other types of physiological responses as measured by other types of physiological monitoring devices/sensors/tools. As illustrated in FIG. 2C, playback device characterization data 238 and/or ambient environment characterization data 240 may be used in the content playback and modification operations (244) of the playback device (236). In the production stage (202, the creatives can (e.g., concurrently, burned into media content or metadata, etc.) specify different physiological response types to be measured with different physiological monitoring devices/sensors/tools in different rendering environments. The playback device may use the playback device characterization data (238) and/or ambient environment characterization data (240) to determine or select one or more specific physiological monitoring devices/sensors/tools (among the different physiological monitoring devices/sensors/tools) to monitor one or more specific physiological response types with respect to an audience.

For the purpose of illustration only, it has been described that (e.g., real time, near real time, etc.) media content adjustments/modifications may be carried out with respect to specific luminance related characteristics such as APLs based on received media content and metadata produced in a production stage and (e.g., real time, near real time, etc.) physiological monitoring. It should be noted that, in various embodiments, (e.g., real time, near real time, etc.) media content adjustments/modifications may be carried out with respect to other luminance related characteristics such as max, min and average luminance values, luminance values of specific image regions, specific objects, specific characters, background, etc., based on received media content and metadata produced in a production stage and (e.g., real time, near real time, etc.) physiological monitoring. Additionally, optionally or alternatively, (e.g., real time, near real time, etc.) media content adjustments/modifications may be carried out with respect to other visual characteristics such as color precisions, saturations, hues, spatial resolutions, image refresh rates, zoom-in and/or -out operations, etc., based on received media content and metadata produced in a production stage and (e.g., real time, near real time, etc.) physiological monitoring. Additionally, optionally or alternatively, (e.g., real time, near real time, etc.) media content adjustments/modifications and related rendering operations may be carried out with respect to audio characteristics, motion-related characteristics, tactile characteristics, etc., based on received media content and metadata produced in a production stage and (e.g., real time, near real time, etc.) physiological monitoring. Additionally, optionally or alternatively, different release versions that support different combinations of types of media content adjustments or modifications and/or that support different combinations of types of physiological monitoring can be produced and consumed by different types of playback devices in different rendering environments.

A media production system implementing techniques as described herein can interact with creatives at different levels to generate media content (e.g., 117-2 of FIG. 1A, etc.) and media metadata (e.g., 117-1 of FIG. 1A, etc.). For example, semantic expressions (indicating expected states at various time points or scenes of a content timeline) in user input as provided by the creatives can be received, extracted, transformed, embedded, and/or implemented in the media content (117-2) and the media metadata (117-1). A viewer's emotional or narrative responses corresponding to (or associated with) the expected states extracted and/or translated from the semantic expressions can be assessed through physiological monitoring while the media content is being dynamically adapted and rendered to the viewer. For example, the viewer's cognitive load at various time points or scenes corresponding to expected narrative states extracted and/or translated from the semantic expressions (e.g., in storyboard information, in creatives' edits, etc.) can be assessed through physiological monitoring to result in media content adjustments/modifications (e.g., increase dialog volume, increase dialog's signal-to-noise ratio, etc.) that is particularly suited to converge the viewer's assessed narrative states to the expected narrative states.

Techniques as described herein can be used to prevent blindly making media content modifications that are not necessary for converging to the expected states and to make individually different media content modifications depending on the viewer, the viewer's playback device, a rendering environment in which the viewer's playback device is operating, and so forth. Thus, for a first viewer with hearing problems affecting the first viewer's narrative states or cognitive loads, dialog volume may be increased. For a second viewer in a noisy rendering environment, dialog signal-to-noise ratio may be increased, instead of raising dialog volume to cause the second viewer to feel that the dialog volume is too loud. For a third viewer with a playback device with headphones that effectively shields ambient noises, dialog volume may be lowered. Other factors such as ambient light, reverb, echo, etc., may also be taken into account in determining a specific type and a specific adjustment magnitude of media content adjustment/modification. In some operational scenarios, the specific type and/or the specific adjustment magnitude of media content adjustment/modification may be determined or generated fully automatically without user input from the creatives other than the semantic expressions provided by the creatives. In various embodiments, none, some or all selection factors, opt-in options, opt-out options, scales, thresholds, lower and upper limits, etc., used to determine or generate the specific type and/or the specific adjustment magnitude of media content adjustment/modification may be exposed through user interfaces to, and wholly or partly controlled by, the creatives or associated artistic and/or engineering professionals (or users). Additionally, optionally or alternatively, more or fewer controls may be given to the creatives working in different fields. In some operational scenarios, as compared with audio professionals, video professionals who are more familiar with how contrast, saturation, etc., impact expected emotional and/or narrative states of a audience/viewer may be given more controls, for example through user interfaces, storyboards, etc., to manipulate visual characteristics and visual characteristics and responses to visual characteristics represented in the media content and metadata.

In a production stage (e.g., 202 of FIG. 2A, etc.), media content (e.g., 117-2 of FIG. 1A, etc.) and media metadata (e.g., 117-1 of FIG. 1A, etc.) may be created in relation to a reference rendering environment (e.g., a cinema, a home theater, a tablet computer, a mobile handset, etc.). For example, audio content and related metadata portions may be created in an ATMOS format for a relatively high-end audio content rendering environment.

In a consumption stage (e.g., 204 of FIG. 2A, etc.), a playback device (with an earbud headset, etc.) in a specific rendering environment may adapt or transform the media content (117-2) and the media metadata (117-1) created in relation to the reference rendering environment to to-be-rendered media content in relation to the specific rendering environment. For example, audio content and related metadata portions, as created in an ATMOS format for a relatively high-end audio content rendering environment in the production stage (202), may be adapted or transformed (e.g., dimension reduced, etc.) into to-be-rendered audio content suitable for the playback device (e.g., earbuds, etc.).

12. Example Process Flows

Figure 4A:
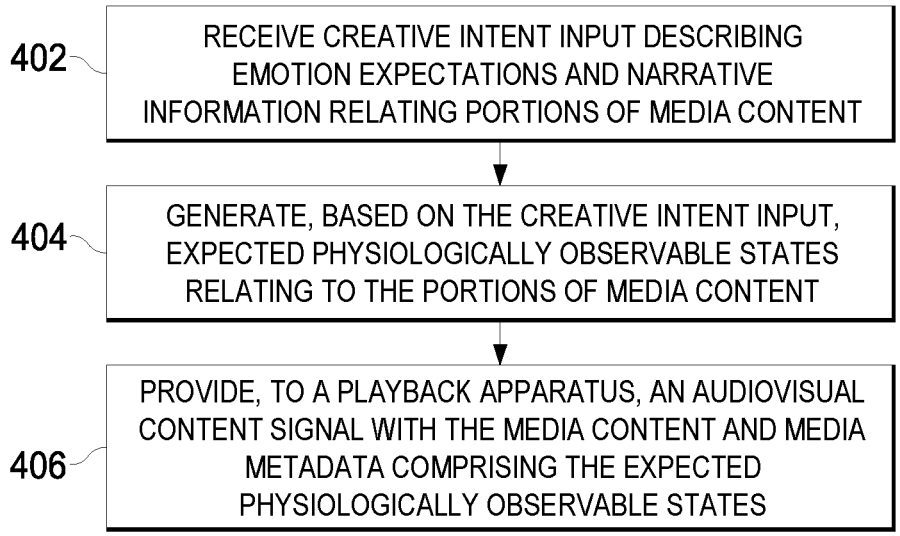
FIG. 4A and FIG. 4B illustrate example process flows.

FIG. 4A illustrates an example process flow according to an example embodiment of the present invention. In some example embodiments, one or more computing devices or components may perform this process flow. In block 402, a media production system receives user input describing emotion expectations and narrative information relating to one or more portions of media content.

In block 404, the media production system generates, based at least in part on the user input, one or more expected physiologically observable states relating to the one or more portions of the media content.

In block 406, the media production system provides, to a playback apparatus, an audiovisual content signal with the media content and media metadata comprising the one or more expected physiologically observable states for the one or more portions of the media content.

In an embodiment, the audiovisual content signal causes the playback device (a) to use one or more physiological monitoring signals to determine, with respect to a viewer, one or more assessed physiologically observable states relating to the one or more portions of the media content and (b) to generate, based at least in part on the one or more expected physiologically observable states and the one or more assessed physiologically observable states, modified media content from the media content as the modified media content generated from the media content is being adjusted and rendered to the viewer.

Figure 4B:
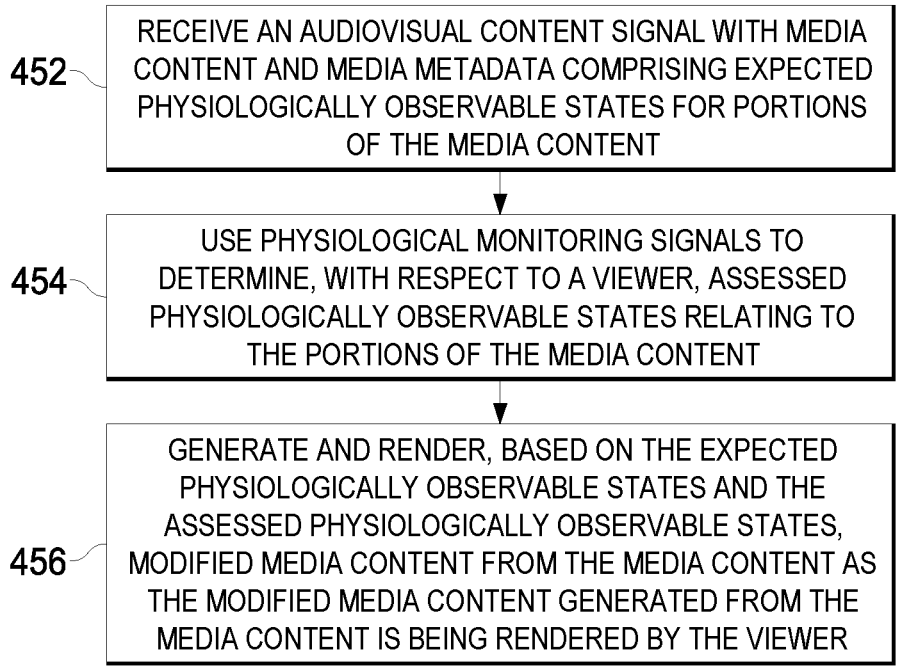

FIG. 4B illustrates an example process flow according to an example embodiment of the present invention. In some example embodiments, one or more computing devices or components may perform this process flow. In block 452, a media production system receives an audiovisual content signal with media content and media metadata. In an embodiment, the media metadata comprises one or more expected physiologically observable states for one or more portions of the media content.

In an embodiment, the one or more expected physiologically observable states relating to the one or more portions of the media content are generated based at least in part on user input describing emotion expectations and narrative information relating to one or more portions of media content.

In block 454, the media production system uses one or more physiological monitoring signals to determine, with respect to a viewer, one or more assessed physiologically observable states relating to the one or more portions of the media content.

In block 456, the media production system generates and renders, based at least in part on the one or more expected physiologically observable states and the one or more assessed physiologically observable states, modified media content from the media content as the modified media content generated from the media content is being adjusted and rendered to the viewer.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

13. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
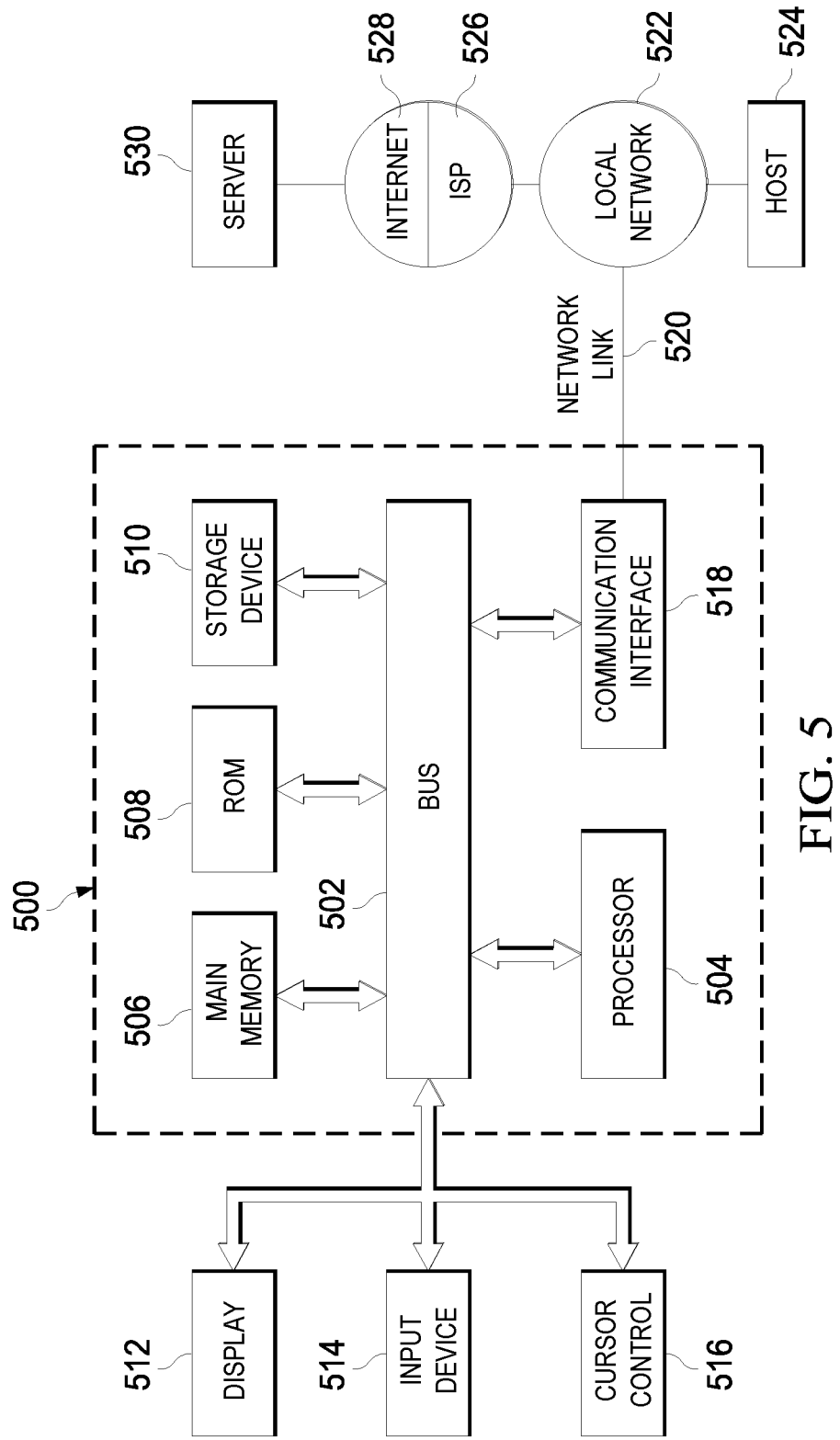
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

14. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention.

EEE1. A computer-implemented method comprising:
receiving creative intent input describing emotion expectations and narrative information relating to one or more portions of media content;
generating, based at least in part on the creative intent input, one or more expected physiologically observable states relating to the one or more portions of the media content;
providing, to a playback apparatus, an audiovisual content signal with the media content and media metadata comprising the one or more expected physiologically observable states for the one or more portions of the media content;
wherein the audiovisual content signal causes the playback device (a) to use one or more physiological monitoring signals to determine, with respect to a viewer, one or more assessed physiologically observable states relating to the one or more portions of the media content and (b) to generate, based at least in part on the one or more expected physiologically observable states and the one or more assessed physiologically observable states, modified media content from the media content as the modified media content generated from the media content is being adjusted and rendered to the viewer.

EEE2. The method of EEE1, wherein the creative intent input represents creative intent of creatives who cause the media content and the media metadata to be generated in a production stage.

EEE3. The method of EEE1 or EEE2, wherein the creative intent input contains semantic expressions of creatives' intent, wherein the media metadata comprises one of: the semantic expressions used to derive a set of non-semantic signal modification options in a consumption stage or the set of non-semantic signal modification options generated based on the semantic expressions in a production stage, and wherein the playback device selects one or more specific signal modification options from the set of signal modification options to perform one or more media content adjustments to the media content to minimize a divergence the one or more expected physiologically observable states and the one or more assessed physiologically observable states in response to determining that the divergence is greater than a divergence threshold.

EEE4. A computer-implemented method comprising:
receiving an audiovisual content signal with media content and media metadata, wherein the media metadata comprises one or more expected physiologically observable states for one or more portions of the media content;
wherein the one or more expected physiologically observable states relating to the one or more portions of the media content are generated based at least in part on creative intent input describing emotion expectations and narrative information relating to one or more portions of media content;
using one or more physiological monitoring signals to determine, with respect to a viewer, one or more assessed physiologically observable states relating to the one or more portions of the media content;
generating and rendering, based at least in part on the one or more expected physiologically observable states and the one or more assessed physiologically observable states, modified media content from the media content as the modified media content generated from the media content is being adjusted and rendered to the viewer.

EEE5. The method of EEE4, wherein the one or more assessed physiologically observable states comprise an assessed emotional state of the viewer, wherein the one or more expected physiologically observable states comprise an expected emotional state, of the viewer, that is of a same emotional state type as the assessed emotional state of the viewer.

EEE6. The method of EEE4 or EEE5, wherein the one or more assessed physiologically observable states comprise an assessed narrative state of the viewer, wherein the one or more expected physiologically observable states comprise an expected narrative state, of the viewer, that is of a same narrative state type as the assessed narrative state of the viewer.

EEE7. The method of any of EEEs 4-6, wherein the one or more assessed physiologically observable states comprise an assessed attention locus of the viewer, wherein the one or more expected physiologically observable states comprise an expected attention locus of the viewer.

EEE8. The method of any of EEEs 4-7, wherein the media metadata comprises one or more signal modification options for modifying the one or more portions of the media content in response to detecting a divergence between the one or more assessed physiologically observable states and the one or more expected physiologically observable states.

EEE9. The method of EEE8, wherein at least one signal modification of the one or more signal modification options comprises instructions for implementing a media content modification on one of more of: luminance, spatial resolution, sharpening, contrast, color saturation, hue, tone mapping, field of view, color gamut, luminance dynamic range, bit depth, spatial filtering, image refresh rate, zoom-in or -out factors, image steering, non-visual characteristics, motion rendering characteristics, pivots, slopes and offsets of luminance mappings, luminance distribution, luminance in specific image regions, specific objects, specific characters, background, positions of audio objects, frequency equalization, reverberation, timbre, phase, number of speakers, speaker configuration, frequency ranges of speakers, phase distortions of speakers, loudspeaker selection, volume, actual audio channel configuration, snap tolerance options for selecting single speaker rendering and for selecting multi-speaker interpolation, audio object positions, audio object sizes, audio object radii, audio object directions, audio object trajectories, dialog volume, non-dialog volume, dialog enhancement, audio dynamic range, specific loudspeaker selection, specific loudspeaker configuration, echo characteristics, delays, signal attack times, or signal release times.

EEE10. The method of EEE8 or EEE9, wherein the one or more signal modification options are used to minimize the divergence between the one or more assessed physiologically observable states and the one or more expected physiologically observable states, with respect to the viewer, in content playback of the media content.

EEE11. The method of any of EEEs 8-10, wherein the one or more physiological monitoring signals are generated by one or more of: display-based sensors, visible wavelength camera sensors, simultaneous localization and mapping sensors, thermal imagers, head-mounted-display sensors, in-ear sensors, wrist sensors, gaze position sensors, pupil diameter sensors, facial expression sensors, head position sensors, viewing distance sensors, facial expression sensors, valence sensors, arousal sensors, electroencephalogram sensors, specifically positioned electrodes, thermal sensors, optical sensors, electro-oculogram sensors, respiration sensors, plethysmography-heartrate-based sensors, galvanic skin response sensors, gas sensors, CO2 content sensors, R3COH content sensors, or seat-based sensors.

EEE12. The method of any of EEEs 8-11, wherein the one or more signal modification options are generated based at least in part on playback device characterization data and rendering environment characterization data.

What is claimed is:

1. A computer-implemented method, comprising:
    receiving an audiovisual content signal including game media content and media metadata, wherein the media metadata comprises metadata corresponding to one or more expected physiologically observable states for one or more portions of the game media content and wherein the one or more expected physiologically observable states relate to emotion expectations and narrative information corresponding to one or more portions of the game media content;
    obtaining one or more physiological monitoring signals from a viewer of the game media content;
    determining, with respect to the viewer, one or more assessed physiologically observable states relating to the one or more portions of the game media content;
    generating and rendering, based at least in part on the one or more expected physiologically observable states and the one or more assessed physiologically observable states, modified game media content from the game media content; and
    presenting the modified game media content to the viewer.

2. The method of claim 1, wherein the one or more assessed physiologically observable states comprise an assessed emotional state of the viewer and wherein the one or more expected physiologically observable states comprise an expected emotional state of the viewer.

3. The method of claim 2, wherein the assessed emotional state and the expected emotional state correspond to at least one of arousal or valence.

4. The method of claim 1, wherein the one or more assessed physiologically observable states comprise an assessed narrative state of the viewer and wherein the one or more expected physiologically observable states comprise an expected narrative state of the viewer.

5. The method of claim 4, wherein the expected narrative state and the assessed narrative state correspond to one or more of stress, cognitive load or attention locus.

6. The method of claim 4, wherein the expected narrative state corresponds to an expected confusion index.

7. The method of claim 1, wherein the one or more assessed physiologically observable states comprise an assessed attention locus of the viewer and wherein the one or more expected physiologically observable states comprise an expected attention locus of the viewer.

8. The method of claim 1, wherein the media metadata comprises one or more modification options for modifying the one or more portions of the game media content in response to detecting a divergence between the one or more assessed physiologically observable states and the one or more expected physiologically observable states.

9. The method of claim 8, wherein at least one modification of the one or more modification options comprises instructions for implementing a game media content modification involving one or more of: luminance, spatial resolution, contrast, color saturation, hue, tone mapping, field of view, color gamut, luminance dynamic range, bit depth, spatial filtering, image refresh rate, one or more regions of interest, one or more audio objects of interest, zoom-in or -out factors, image steering, nonvisual characteristics, motion rendering characteristics, pivots, slopes and offsets of luminance mappings, luminance distribution, luminance in specific image regions, specific objects, specific characters, background, positions of audio objects, frequency equalization, reverberation, timbre, phase, number of speakers, speaker configuration, frequency ranges of speakers, phase distortions of speakers, loudspeaker selection, volume, actual audio channel configuration, snap tolerance options for selecting single speaker rendering and for selecting multi-speaker interpolation, one or more audio object positions, one or more audio object sizes, audio object radii, one or more audio object directions, or one or more audio object trajectories, dialog volume, non-dialog volume, dialog enhancement, audio dynamic range, specific loudspeaker selection, specific loudspeaker configuration, echo characteristics, delays, signal attack times, or signal release times.

10. The method of claim 8, wherein at least one modification of the one or more modification options comprises instructions for implementing an image steering modification and wherein the image steering modification involves steering images to follow the viewer's movements from room to room.

11. The method of claim 8, wherein at least one modification of the one or more modification options comprises instructions for implementing an attention steering modification and wherein the attention steering modification involves steering the viewer's attention locus towards an area of interest of the game media content, towards a region of interest of the game media content, away from an area of interest of the game media content, or away from a region of interest of the game media content.

12. The method of claim 8, wherein at least one modification of the one or more modification options comprises instructions for implementing a game media content modification involving one or more of: one or more visual characteristics of a sequence of rendered images, one or more visual characteristics of a visual scene bounded by two consecutive scene cuts, one or more visual characteristics of a subdivision of a visual scene, one or more visual characteristics of a group of pictures (GOP), one or more visual characteristics of one or more tile-sized regions spanning multiple frames, one or more visual characteristics of portions of a spatiotemporal stream, one or more visual characteristics of an entire image, one or more visual characteristics of an image region that depicts a specific character or one or more visual characteristics of an image region that depicts a specific object.

13. The method of claim 8, wherein the one or more modification options are used to minimize the divergence between the one or more assessed physiologically observable states and the one or more expected physiologically observable states, with respect to the viewer, in content playback of the game media content.

14. The method of claim 8, wherein the one or more physiological monitoring signals are obtained from one or more of: display-based sensors, visible wavelength camera sensors, simultaneous localization and mapping sensors, thermal imagers, head-mounted-display sensors, in-ear sensors, wrist sensors, gaze position sensors, pupil diameter sensors, facial expression sensors, head position sensors, viewing distance sensors, facial expression sensors, valence sensors, arousal sensors, electroencephalogram sensors, specifically positioned electrodes, thermal sensors, optical sensors, electro-oculogram sensors, respiration sensors, plethysmography-heartrate-based sensors, galvanic skin response sensors, gas sensors, CO2 content sensors, R3COH content sensors, or seat-based sensors.

15. The method of claim 8, wherein the one or more signal modification options are generated based at least in part on playback device characterization data, rendering environment characterization data, or a combination thereof.

16. An apparatus, comprising:
an interface system; and
a control system configured to:
receive, via the interface system, an audiovisual content signal including game media content and media metadata, wherein the media metadata comprises metadata corresponding to one or more expected physiologically observable states for one or more portions of the game media content and wherein the one or more expected physiologically observable states relate to emotion expectations and narrative information corresponding to one or more portions of the game media content;
obtain, via the interface system, one or more physiological monitoring signals from a viewer of the game media content;
determine, with respect to the viewer, one or more assessed physiologically observable states relating to the one or more portions of the game media content;
generate and render, based at least in part on the one or more expected physiologically observable states and the one or more assessed physiologically observable states, modified game media content from the game media content; and
present the modified game media content to the viewer.

17. The apparatus of claim 16, wherein the one or more assessed physiologically observable states comprise an assessed emotional state of the viewer and wherein the one or more expected physiologically observable states comprise an expected emotional state of the viewer.

18. The apparatus of claim 17, wherein the assessed emotional state and the expected emotional state correspond to at least one of arousal or valence.

19. The apparatus of claim 16, wherein the one or more assessed physiologically observable states comprise an assessed narrative state of the viewer and wherein the one or more expected physiologically observable states comprise an expected narrative state of the viewer.

20. One or more non-transitory storage media having software stored thereon, the software including instructions for controlling one or more devices to perform a method, the one or more devices including a playback device, the method comprising:
receiving an audiovisual content signal including game media content and media metadata, wherein the media metadata comprises metadata corresponding to one or more expected physiologically observable states for one or more portions of the game media content and wherein the one or more expected physiologically observable states relate to emotion expectations and narrative information corresponding to one or more portions of the game media content;
obtaining one or more physiological monitoring signals from a viewer of the game media content;
determining, with respect to the viewer, one or more assessed physiologically observable states relating to the one or more portions of the game media content;
generating and rendering, based at least in part on the one or more expected physiologically observable states and the one or more assessed physiologically observable states, modified game media content from the game media content; and
presenting the modified game media content to the viewer.

* * * * *